(12) United States Patent
Fujimoto et al.

(10) Patent No.: US 6,985,989 B2
(45) Date of Patent: Jan. 10, 2006

(54) STORAGE APPARATUS HAVING PLURAL CONTROLLER INCLUDING INTERCONNECTED MEMORIES

(75) Inventors: Kazuhisa Fujimoto, Kokubunji (JP); Hiroki Kanai, Higashiyamato (JP); Akira Fujibayashi, Kokubunji (JP); Wataru Sakurai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 10/643,973

(22) Filed: Aug. 20, 2003

(65) Prior Publication Data

US 2004/0034737 A1 Feb. 19, 2004

Related U.S. Application Data

(63) Continuation of application No. 10/335,899, filed on Jan. 3, 2003, now Pat. No. 6,647,461, which is a continuation of application No. 10/234,471, filed on Sep. 5, 2002, now Pat. No. 6,519,680, which is a continuation of application No. 09/663,379, filed on Sep. 15, 2000, now Pat. No. 6,477,619.

(30) Foreign Application Priority Data

Mar. 10, 2000 (JP) .............................. 2000-072469

(51) Int. Cl.
G06F 13/14 (2006.01)
G06F 12/02 (2006.01)
(52) U.S. Cl. ...................... 710/305; 710/316; 711/113; 711/114
(58) Field of Classification Search ................ 710/313, 710/316, 104, 74, 1, 305; 714/3, 7; 709/229, 709/232, 253; 711/112–114, 147, 148, 130
See application file for complete search history.

(56) References Cited

U.S. PATENT DOCUMENTS

| 4,809,091 | A | * | 2/1989 | Miyazawa et al. ............. 360/48 |
| 5,603,005 | A | | 2/1997 | Bauman et al. .............. 710/317 |
| 5,680,640 | A | | 10/1997 | Ofek et al. .................. 709/100 |
| 5,841,775 | A | | 11/1998 | Huang .................... 340/825.29 |
| 5,960,455 | A | | 9/1999 | Bauman ...................... 711/120 |
| 6,006,296 | A | | 12/1999 | Gold et al. .................. 710/100 |
| 6,073,218 | A | * | 6/2000 | DeKoning et al. ........... 711/150 |
| 6,085,333 | A | | 7/2000 | DeKoning et al. .............. 714/7 |
| 6,092,155 | A | | 7/2000 | Olnowich .................... 709/200 |
| 6,256,749 | B1 | | 7/2001 | Kakuta et al. .................. 714/6 |

(Continued)

FOREIGN PATENT DOCUMENTS

JP 1166693 3/1999

OTHER PUBLICATIONS

"Disk system architectures for high performance computing" by Katz et al. (abstract only) Publication Date Dec. 1989.*

*Primary Examiner*—Gopal C. Ray
(74) *Attorney, Agent, or Firm*—Mattingly, Stanger, Malur & Brundidge, P.C.

(57) ABSTRACT

A disk array controller is made up of multiple disk array control units for implementing the data read/write operation and each having channel IF units, disk IF units, cache memory units and shared memory units. The disk array controller further includes inter connections for interconnecting the shared memory units and interconnecting the cache memory units across the border of disk array control units. Thereby alleviating the deterioration of performance due to the data transfer between the disk array control units, when the multiple disk array control units are to be operated as a single disk array controller.

6 Claims, 21 Drawing Sheets

U.S. PATENT DOCUMENTS

| | | | |
|---|---|---|---|
| 6,256,762 B1 * | 7/2001 | Beppu | 714/763 |
| 6,385,681 B1 | 5/2002 | Fujimoto et al. | 710/316 |
| 6,425,049 B1 | 7/2002 | Yamamoto et al. | 711/112 |
| 6,477,619 B1 | 11/2002 | Fujimoto | |
| 6,496,951 B1 * | 12/2002 | Tuccio | 714/718 |
| 6,519,680 B2 | 2/2003 | Fujimoto | |
| 2001/0001325 A1 | 5/2001 | Fujimoto et al. | 711/114 |
| 2002/0091898 A1 | 7/2002 | Matsunami et al. | 711/114 |

* cited by examiner

400:PACKET

| 401: ADDRESS | 402: COMMAND | 403: DATA |

410:REFFERENCE TABLE FOR PATH SWITCH

| ADDRESS. | PORT No. |
|---|---|
| 0×0···000 | 0 |
| 0×0···001 | 0 |
| ⋮ | ⋮ |
| 0×0···OFF | 0 |
| 0×0···100 | 1 |
| ⋮ | ⋮ |
| 0×0···200 | 2 |
| ⋮ | ⋮ |

STORAGE APPARATUS HAVING PLURAL CONTROLLER INCLUDING INTERCONNECTED MEMORIES

The present application is a continuation of application Ser. No. 10/335,899, filed Jan. 3, 2003 now U.S. Pat. No. 6,647,461; which is a continuation of application Ser. No. 10/234,471, filed Sep. 5, 2002, now U.S. Pat. No. 6,519,680; which is a continuation of application Ser. No. 09/663,379, filed Sep. 15, 2000, now U.S. Pat. No. 6,477,619, the contents of which are incorporated herein by reference.

BACKGROUND OF THE INVENTION

The present invention relates to a controller of a disk array apparatus which stores data on multiple hard disk drives.

As compared with the computer main storage which is based on the semiconductor memory, the disk subsystem (will be termed simply "subsystem") which is based on the magnetic disk memory is sluggish in regard to the I/O performance by a degree of the order of 3–4 digits, and continuous efforts have been paid to reduce the difference of these memories, i.e., improve the I/O performance of the subsystem.

A known scheme to improve the I/O performance of the subsystem is the adoption of a disk array system in which multiple hard disk drives are organized to form a subsystem, and data is stored on the multiple hard disk drives.

For example, a prior art system shown in FIG. 2 includes multiple channel IF units 11 which implement the data transfer between host computers 50 and disk array controllers 2, multiple disk IF units 12 which implement the data transfer between magnetic disk drives 5 and disk array controllers 2, cache memory units 14 which temporarily store data of the hard disk drives 5, and shared memory units 13 which store control information for the disk array controllers 2 (e.g., information on data transfer control between the channel IF units 11 and disk IF units 12 and the cache memory units 14 and control information for data stored in the hard disk drives 5). In each disk array controller 2, the shared memory unit 13 and cache memory unit 14 can be accessed by all channel IF units 11 and disk IF units 12.

In the disk array controller 2, the channel IF units 11 and disk IF units 12 are connected to the shared memory unit 13 by an interconnection 21, and the channel IF units 11 and disk IF units 12 are connected to the cache memory unit 14 by another interconnection 22.

The channel IF unit 11 has the interface for the connection to host computers 50 and a microprocessor (not shown) which controls the data transaction with the host computers 50. The disk IF unit 12 has the interface for the connection to hard disk drives 5 and a microprocessor (not shown) which controls the data transaction with the hard disk drives 5. The disk IF units 12 have the RAID function.

This conventional disk array controller 2 has an upper limit of disk storage capacity which can be connected to it, and therefore for storing data in excess of the volume of data manageable by one disk array controller 2, multiple disk array controllers 2 are installed and channels from the host computers 50 are connected to the disk array controllers 2. Furthermore, for connecting host computers 50 in excess of the number of host channels which can be connected to one disk array controller 2, multiple disk array controllers 2 are installed and connected to the host computers 50 individually.

For data transfer between two disk array controllers 2, channels from the host computers 50 are connected to the two disk array controllers 2 and data is transferred via the host computers 50.

Another prior art system shown in FIG. 3, which is disclosed in U.S. Pat. No. 5,680,640, is designed for example to transfer data between two disk array controllers 3 based on the connection of part (two lines in FIG. 3) of the computer interface paths of the disk array controllers 3 and the data transfer from a hard disk drive 5 which is connected to one disk array controller 3 to another hard disk drive 5 which is connected to another disk array controller 3 through the data transfer path 8.

Another prior art system shown in FIG. 4 is designed for example to store data in excess of the volume of data manageable by one disk array controller, connect host computers in excess of the number of host channels which can be connected to one disk array controller, or transfer data among multiple disk array controllers, as shown in FIG. 4, based on the installation of multiple disk array controllers 4 and the connection of their computer interface paths to the host computers 50 via a switch-based interconnection 23.

A disk array processing device disclosed in Japanese Unexamined Patent Publication No.Hei-11-66693 includes two director units which use a shared memory to recover data when a data spindle which forms a disk array runs out of control. This patent publication, however, does not show the installation of multiple disk arrays.

In large business enterprises which typically include banks, stock traders, and telephone companies, there are trends of cutting the expenditure for the operation, maintenance and management of computer systems and storage systems based on the centralized installation of computers and storages which have been installed distributively in many places. In this movement with the times, large high-end disk array controllers are required to bear the channel interface for the connection to several-hundreds or more host computers and huge storage capacities of several-hundreds terabytes or more.

At the same time, due to growing open markets in recent years and storage area networks (SANs) which are expected to prevail in coming years, there are rising demands of small-scale (compact) disk array controllers which are comparable in performance and reliability with large high-end disk array controllers.

The former requirement will conceivably be met by connecting multiple conventional large high-end disk array controllers to build a huge disk array controller. The latter requirement will conceivably be met by arranging a lowest-level model (e.g., with small numbers of channel IF units and disk IF units) of a conventional large high-end disk array controller. An additional conceivable scheme is to connect a plurality of this compact disk array controller thereby to build a controller which supports systems of medium to large scales which have been supported by a conventional disk array controller.

Accordingly, it becomes necessary for disk array controllers to have the scalability so as to be constructed to cover the range from a small to huge-scale controllers based on the same basic architecture of high performance and high reliability, and therefore there arises a demand of a disk array controller, a plurality of which are integrated to operate as a single disk array controller.

However, although the prior art system shown in FIG. 2 can have an increased number of channels and increased storage capability for the host computers 50 by simply increasing the number of disk array controllers 2, the host computers 50 need to connect channels to all disk array controllers 2 so that one host computer 50 can transact data with multiple disk array controllers 2. Moreover, it is necessary for one host computer 50 which is going to make access to data to identify a disk array controller 2 that is connected to the hard disk drive 5 which stores the data. On this account, it is difficult to operate multiple disk array controllers as a single disk array controller.

The prior art system shown in FIG. 3 has disk array controllers 3 interconnected by the data transfer path 8, enabling one host computer 50 which is connected to a certain disk array controller 3 to make access to data on a hard disk drive 5 which is connected to other disk array controller 3, and accordingly it is possible to operate multiple disk array controllers 3 as a single disk array controller.

However, in case a host computer 50 issues a data read request to a disk array controller 3 and the data is absent on the hard disk drives 5 connected to the controller 3, it is necessary for the disk array controller 3 to send the read request to other disk array controller 3 over the data transfer path 8, receive the requested data over the data transfer path 8 from the disk array controller 3 which is connected to the hard disk drive 5 on which the data is stored, and send the requested data to the host computer 50. On this account, this system suffers a degraded performance when a host computer 50 makes access to data which is stored on a hard disk drive 5 connected to a disk array controller 3 other than the disk array controller 3 connected to itself.

For coping with this matter, if a host computer 50 transfers in advance data of frequent access, which is stored on a hard disk drive of a disk array controller other than that connected to itself, to the hard disk drive 5 of the disk array controller connected to itself, the system also suffers a degraded performance due to the data transfer over the data transfer path 8.

In the prior art system shown in FIG. 4, each host computer 50 can access to all disk array controllers 4 via the switch-based interconnection 23. However, in order to operate multiple disk array controllers 4 as a single disk array controller, each switch of the interconnection 23 must have a map indicating as to which of all disk array controllers 4 connected to the switch stores data, and must have a function of analyzing the access request from a host computer 50 and designating a disk array controller 4 which stores the requested data.

Due to the need of request command analysis by the switches besides the command analysis by the conventional channel IF units 11, this system suffers a degraded performance in contrast to the direct connection of the host computers 50 to the disk array controllers 4.

The high-end disk array controllers have following functions.

As a specific operational function, a data set (corresponding to a logical volume) for one work is duplicated and stored and both the original and duplicate data sets are updated simultaneously in the ordinary work. At the emergence of the need of backup for the data set for example, updating of the duplicate data set is suspended and it is used for the backup, while the original data set is used continuously for the work, and the original and duplicate data sets are rendered the matching process on completion of backup.

For accomplishing this operational function, with duplicate data sets being held in different disk array controllers, the prior art systems shown in FIG. 2 to FIG. 4 all need to transfer data sets among the disk array controllers, resulting in a significantly deteriorated system performance.

SUMMARY OF THE INVENTION

An object of the present invention is to provide a disk array controller having the scalability so as to be constructed to cover the range from a small to huge-scale controllers based on the same basic architecture of high performance and high reliability.

More specifically, the present invention is intended to provide a disk array system which is capable of alleviating the deterioration of performance caused by the data transfer among multiple disk array controllers which are designed to operated as a single disk array controller, and accomplish the function of a disk array controller based on a plurality of disk array controllers while alleviating the deterioration of performance.

In order to achieve the above objectives, the present invention resides in a disk array controller which includes a plurality of disk array control units, each having one or more channel interface units for interfacing with a computer, one or more disk interface units for interfacing with disk drives, a cache memory unit which is connected to the channel interface unit and disk interface unit and adapted to store temporarily data which is written to or read out of the disk drives, and a shared memory unit which is connected to the channel interface unit and disk interface unit and adapted to store control information of data transfer between the channel interface unit and disk interface unit and the cache memory unit and control information for the disk drives, and having a disk control function for implementing the data read/write operation in response to a data read/write request from the host computer by operating on the channel interface unit to transfer data between the interface with the host computer and the cache memory unit and operating on the disk interface unit to transfer data between the disk drive and the cache memory unit, and further includes means of interconnecting the shared memory units in the disk array control units and means of interconnecting the cache memory units in the disk array control units, thereby enabling the data read/write access from a channel interface unit or disk interface unit in one disk array control unit to a shared memory unit or cache memory unit in other disk array control unit.

DESCRIPTION OF THE PREFERRED EMBODIMENTS

Figure 1:
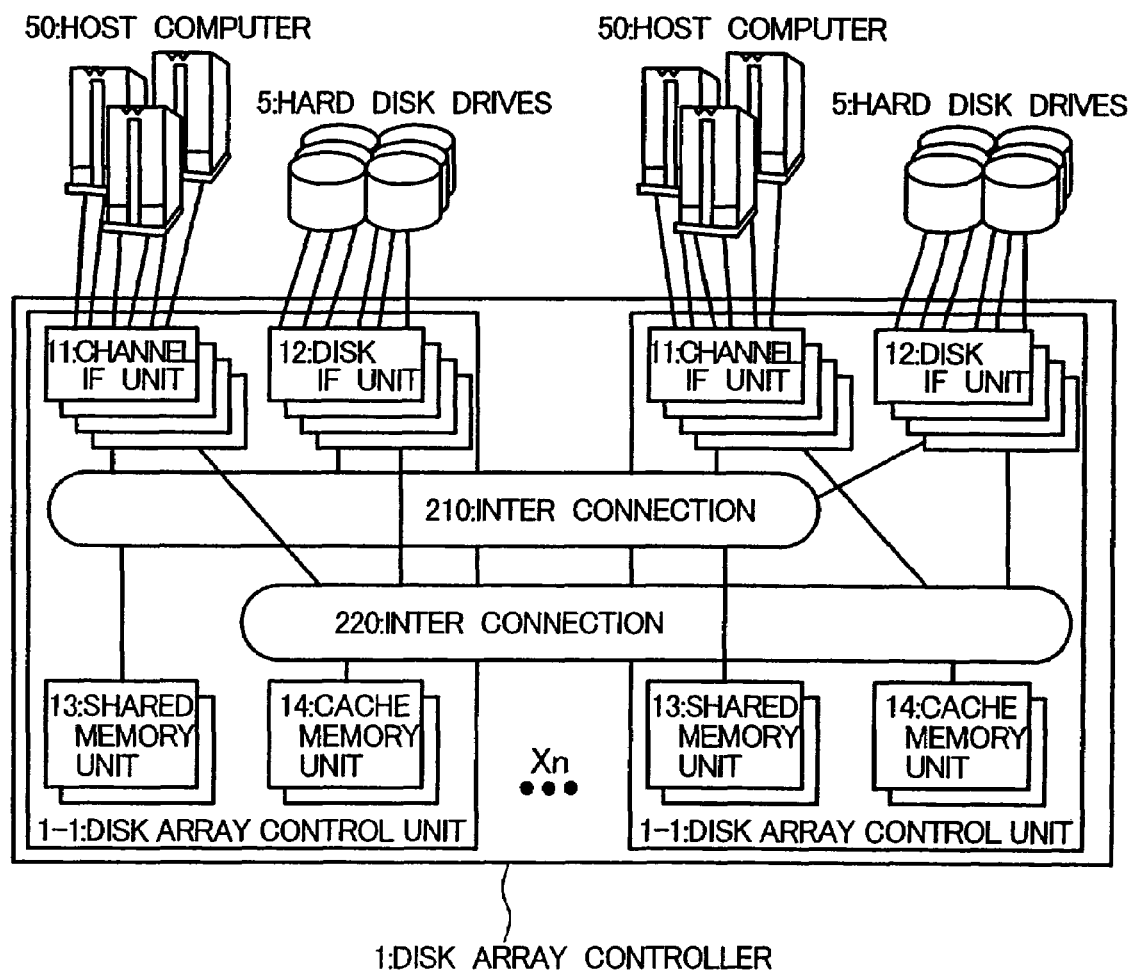
FIG. 1 is a block diagram showing the arrangement of a disk array controller based on this invention.
Figure 2:
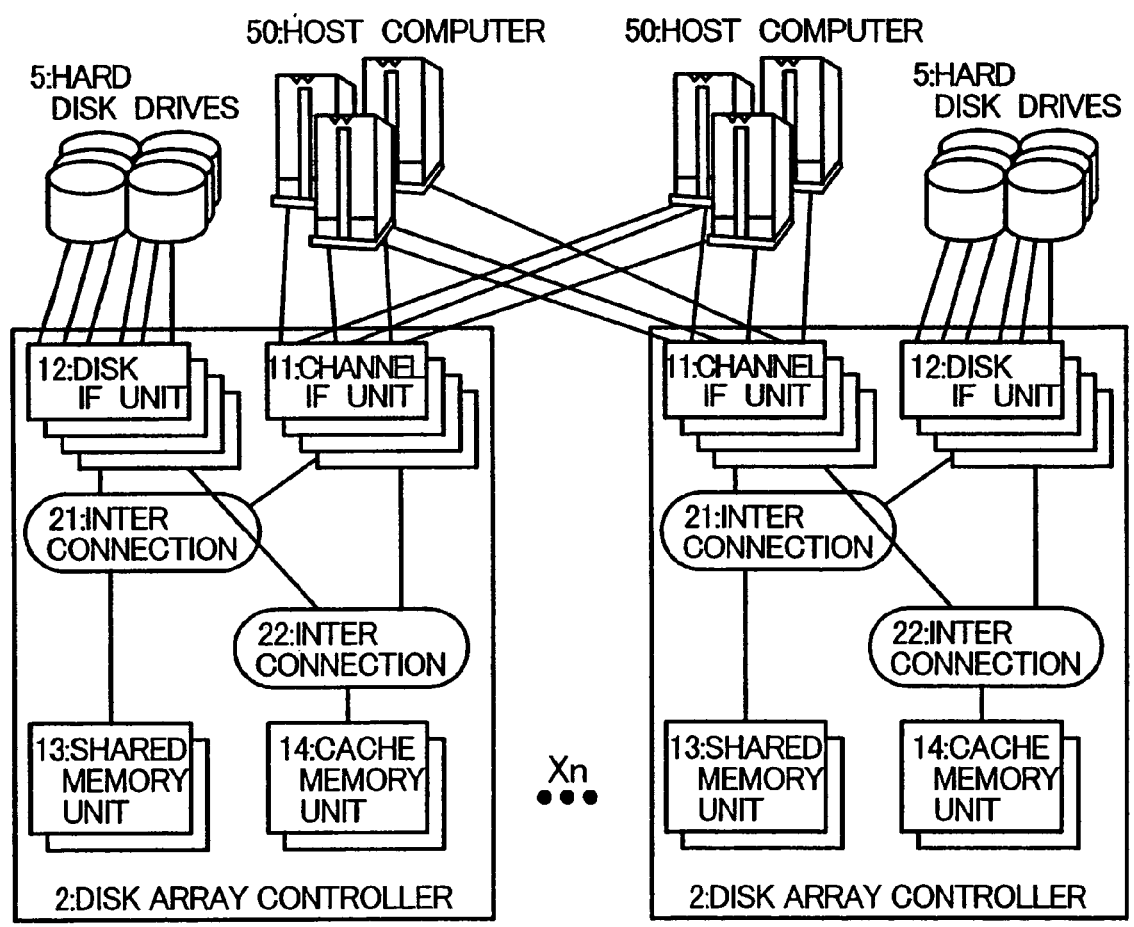
FIG. 2 is a block diagram showing the arrangement of a conventional disk array controller.
Figure 3:
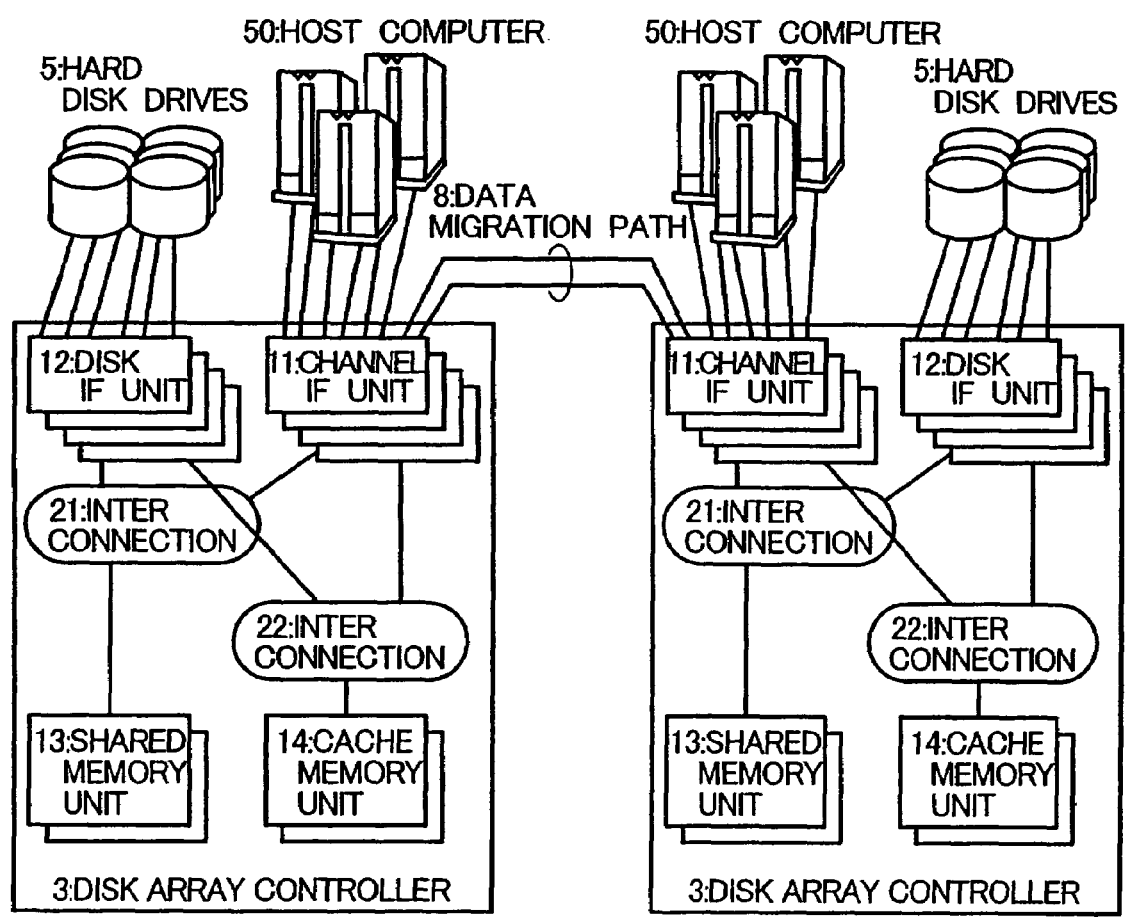
FIG. 3 is a block diagram showing the arrangement of another conventional disk array controller.
Figure 4:
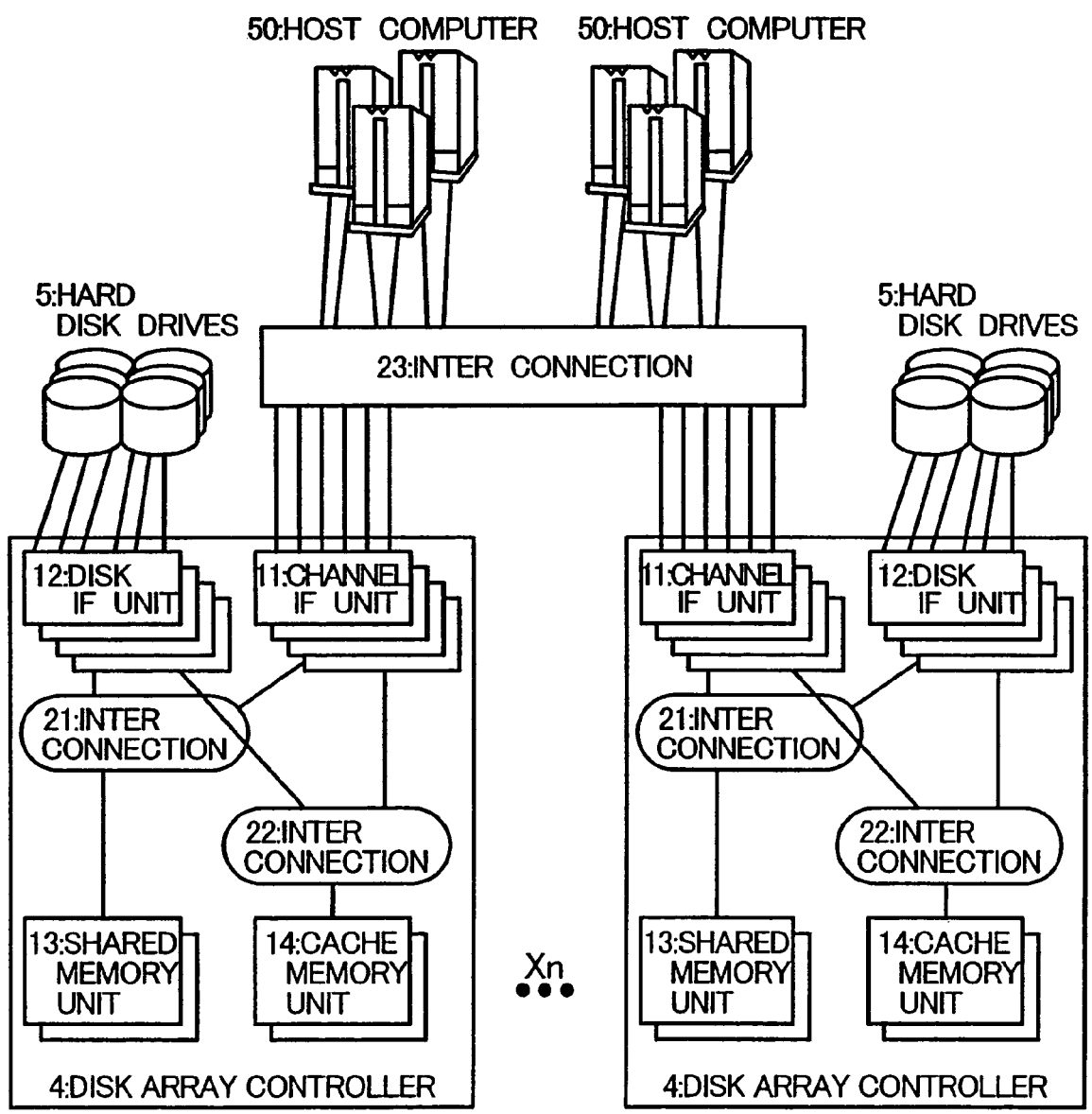
FIG. 4 is a block diagram showing the arrangement of still another conventional disk array controller.

In the following embodiments of this invention, hard disk drives are adopted for a large-capacity data storage. However, it is not confined in this invention to hard disk drives, but it can be DVDs for example.

As a preferred embodiment of this invention, the channel interface units and disk interface units and the cache memory units in the multiple disk array control units are interconnected by a switch-based interconnection which extends across the border of disk array control units, and the channel interface units and disk interface units and the shared memory units are interconnected by another switch-based interconnection which extends across the border of disk array control units.

As another preferred embodiment, the channel interface units and disk interface units and the cache memory units in the multiple disk array control units are interconnected by a switch-based interconnection which extends across the border of disk array control units, and the channel interface units and disk interface units and the shared memory units are connected directly for the portion within each disk array control unit and interconnected for the portion between the shared memory units between the disk array control units by a switch-based interconnection which extends across the border of disk array control units.

As another preferred embodiment, the channel interface units and disk interface units and the cache memory units in the multiple disk array control units are connected directly for the portion within each disk array control unit and interconnected for the portion between the cache memory units between the disk array control units by a switch-based interconnection which extends across the border of disk array control units, and the channel interface units and disk interface units and the shared memory units are connected directly for the portion within each disk array control unit and interconnected for the portion between shared memory units between the disk array control units by a switch-based interconnection which extends across the border of disk array control units.

With respect to the data read/write operation between host computers and the hard disk drives, the inventive disk array controller includes a plurality of disk array control units, each having channel interface units for interfacing with the computers, disk interface units for interfacing with the hard disk drives, a cache memory unit for storing temporarily data which is written to or read out of the hard disk drives, a shared memory unit for storing control information of data transfer between the channel interface units and disk interface units and the cache memory unit and control information for the hard disk drives, means of connecting the channel interface units and disk interface units to the cache memory unit, and means of connecting the channel interface units and disk interface units to the shared memory unit, and implementing data read/write in response to a data read/write request from the host computer by operating on the channel interface units to transfer data between the interface with the host computer and the cache memory unit and operating on the disk interface units to transfer data between the hard disk drive and the cache memory unit, and further includes means of interconnecting the shared memory units in the disk array control units and means of interconnecting the cache memory units in the disk array control units, thereby enabling the data read/write access from a host computer which is connected only to one disk array control unit to a hard disk drive which is connected only to other disk array control unit by way of the interconnection means.

Other problems and schemes of solving the problems based on the present invention will become apparent from the following description of embodiments taken in conjunction with the accompanying drawings.

Embodiments of the present invention will be explained with respect to the drawings.

[Embodiment 1]

Figure 7:
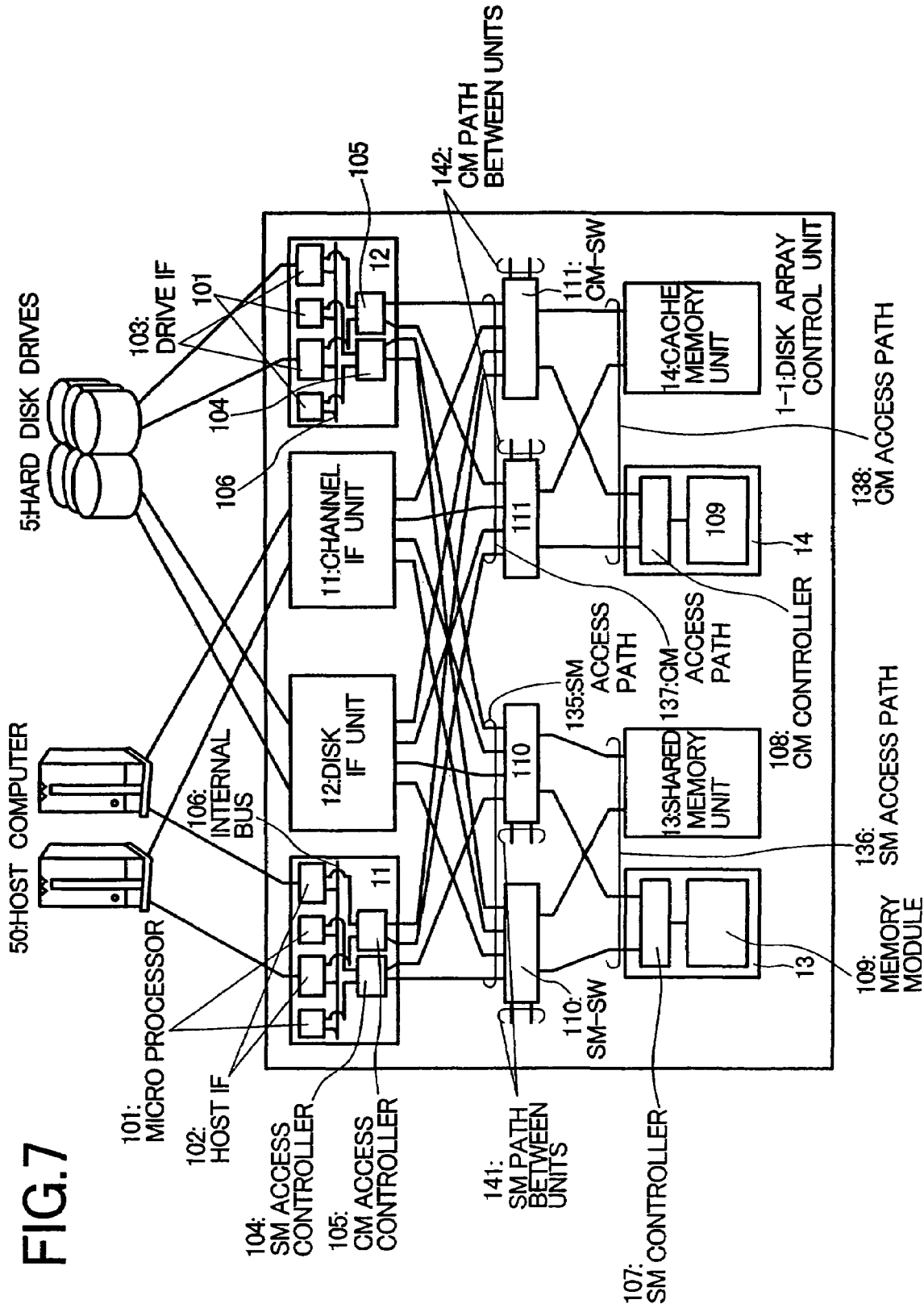
FIG. 7 is a block diagram showing the detailed arrangement of the disk array control unit shown in FIG. 1.
Figure 8:
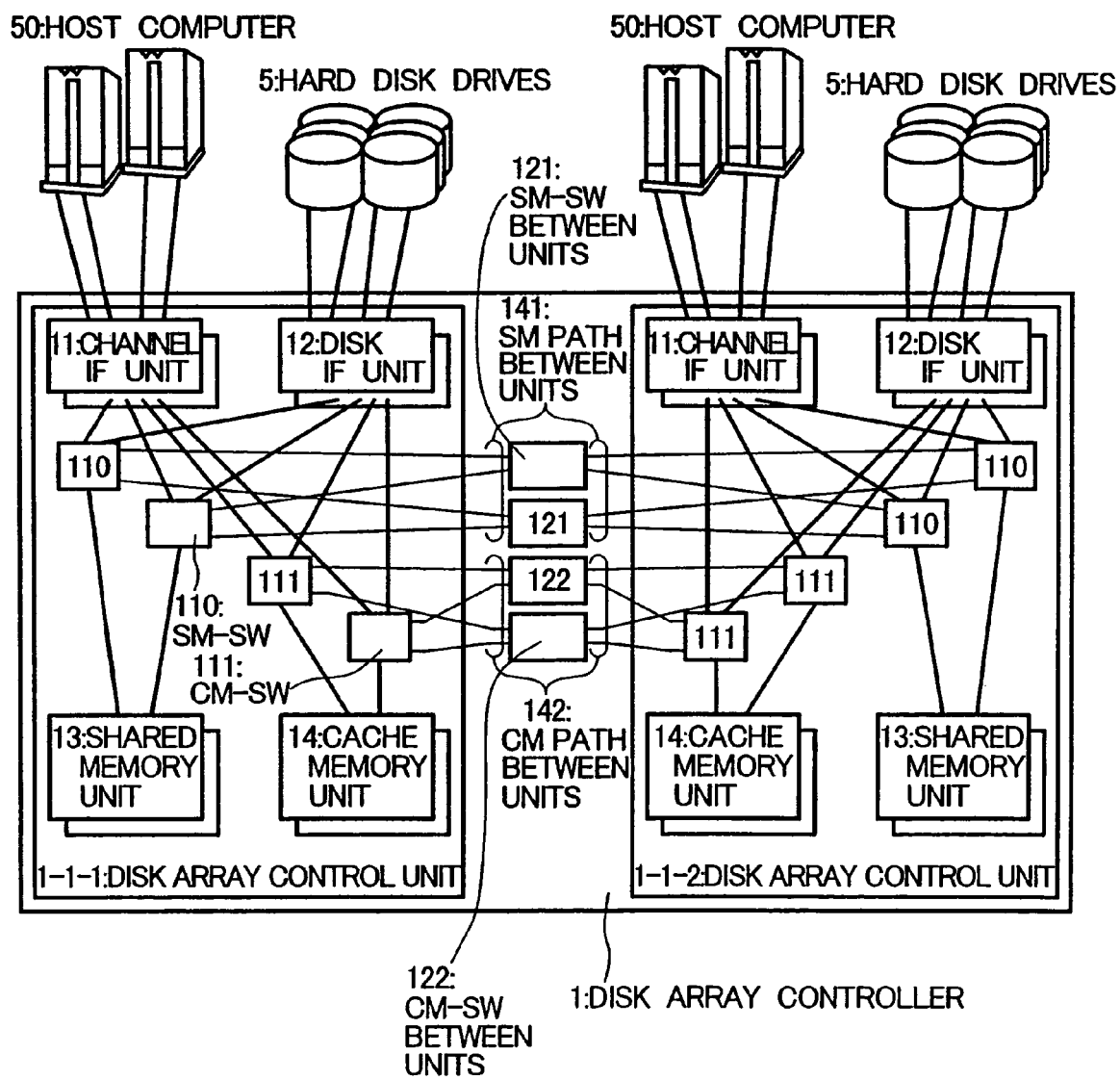
FIG. 8 is a block diagram showing the arrangement of a disk array controller made up of two disk array control units shown in FIG. 7 connected together.

FIG. 1, FIG. 7 and FIG. 8 show an embodiment of this invention. Although devices of interconnection used in this embodiment are based on switches, these devices which function to transfer control information and data between two units may otherwise be buses for example.

A disk array controller 1 of this embodiment is made up of multiple disk array control units 1-1 as shown in FIG. 1. Each disk array control unit 1-1 includes interface units (channel IF units) 11 for interfacing with host computers 50, interface units (disk IF units) 12 for interfacing with hard disk drives 5, shared memory units 13, and cache memory units 14. The channel IF units 11 and disk IF units 12 and the shared memory units 13 are connected by an interconnection 210 which is shared by the disk array control units 1-1, and the channel IF units 11 and disk IF units 12 and the cache memory units 14 are connected by another interconnection 220 which is shared by the disk array control units 1-1. Accordingly, all channel IF units 11 and disk IF units 12 can access to all shared memory units 13 or all cache memory units 14 via the interconnection 210 or 220.

One disk array control unit, which may be either built on a rack or built as a module, can operate as a stand-alone disk array controller. Each disk array control unit is assumed to be built on an individual rack in the explanation of FIG. 7.

FIG. 7 shows a specific internal arrangement of the disk array control unit 1-1.

The disk array control unit 1-1 includes two channel IF units 11 for interfacing with host computers 50, two disk IF units 12 for interfacing with the hard disk drives 5, two shared memory path switches (SM-SWs) 110, two cache memory path switches (CM-SWs) 111, two shared memory units 13, two cache memory units 14, shared memory (SM) access paths 135 and 136, cache memory (CM) access paths 137 and 138, inter-unit SM paths 141, and inter-unit CM paths 142. The inter-unit SM paths and inter-unit CM paths connect between the disk array control units.

The channel IF unit 11 includes two host IFs 102 for interfacing with the host computers 50, two microprocessors 101 which control the data transaction with the host computers 50, an SM access controller 104 which controls the access to the shared memory units 13, and a CM access controller 105 which controls the access to the cache memory units 14. It implements the data transfer between the host computers 50 and the cache memory units 14 and the transfer of control information between the microprocessors 101 and the shared memory units 13. The microprocessors 101 and host IFs 102 are connected by an internal bus 106. The CM access controller 105 is connected directly to the two host Ifs 102. The SM access controller 104 is connected directly to the two microprocessors 101.

The disk IF unit 12 includes two drive IFs 103 for interfacing with hard disk drives 5, two microprocessors 101 which control the data transaction with the hard disk drives 5, an SM access controller 104 which controls the access to the shared memory units 13, and a CM access controller 105 which controls the access to the cache memory units 14. It implements the data transfer between the hard disk drives 5 and the cache memory units 14 and the transfer of control information between the microprocessors 101 and the shared memory units 13. The microprocessors 101 and drive IFs 103 are connected by an internal bus 106, the CM access controller 105 is connected directly to the drive IFs 103, and the SM access controller 104 is connected directly to the microprocessors 101. The disk IF unit 12 also implement the RAID function.

The shared memory unit 13 includes a shared memory (SM) controller 107 and a memory module 109, and it stores control information of the disk array control unit 1-1 (e.g., information on data transfer control between the channel IF units 11 and disk IF units 12 and the cache memory units 14, and control information for data recorded on the hard disk drives 5).

The cache memory unit 14 includes a cache memory (CM) controller 108 and a memory module 109, and it temporarily stores data to be recorded on the hard disk drives 5.

The SM access controller 104 is connected to the two SM-SWs 110 which is different from each other by two SM access paths 135, and the SM-SWs 110 are connected to the two SM controllers 107 which is different from each other by two access paths 136. Accordingly, each SM controller 107 has the connection of two access paths 136 coming from the two SM-SWs 110, enabling each SM controller 104 to have two access routes to each SM controller 107. In consequence, in the event of a fault on one access path or in one SM-SW 110, the shared memory units 13 are kept accessible through another route.

The CM access controller 105 is connected to the two CM-SWs 111 by two CM access paths 137, and the CM-SWs 111 are connected to the two CM controllers 108 by two access paths 138. Accordingly, each CM controller 108 has the connection of two access paths 138 coming from the two CM-SWs 111, enabling each CM controller 105 to have two access routes to each CM controller 108. In consequence, in the event of a fault on one access path or in one CM-SW 111, the cache memory units 14 are kept accessible through another route.

The SM-SW 110 has the connection of four SM access paths 135 coming from the two channel IF units 11 and two disk IF units 12, and also has the connection of two access paths 136 going to the two shared memory units 13. The SM-SW 110 also has the connection of two inter-unit SM paths 141 for the connection with SM-SWs 110 of other disk array control unit 1-1. These inter-unit SM paths 141 may be designed differently for input and output, or may be designed equally for the bidirectional information transfer.

The CM-SW 111 has the connection of four CM access paths 137 coming from the two channel IF units 11 and two disk IF units 12, and also has the connection of two access paths 138 going to the two cache memory units 14. The CM-SW 111 also has the connection of two inter-unit CM paths 142 for the connection with CM-SWs 111 of other disk array control unit 1-1. These inter-unit CM paths 142 have the same design as the inter-unit SM paths 141.

Based on the above-mentioned access path connection of the SM-SWs 110 and CM-SWs 111, these SWs 110 and 111 have a function of directing access requests from the channel IF units 11 and disk IF units 12 over the four access paths to the two access paths of the shared memory units 13 or cache memory units 14 within the self disk array control unit 1-1 and the two inter-unit access paths of the shared memory units 13 or cache memory units 14 of other disk array control unit 1-1.

In the arrangement of FIG. 7, the SM-SWs 110 are connection nodes between the channel IF units 11 and disk IF units 12 and the shared memory units 13, and the CM-SWs 111 are connection nodes between the channel IF units 11 and disk IF units 12 and the cache memory units 14.

FIG. 8 shows an example of the disk array controller 1 which is configured by connecting two disk array control units 1-1 shown in FIG. 7. The two disk array control units 1-1-1 and 1-1-2 have their SM-SWs 110 interconnected by inter-unit SM paths 141 via inter-unit SM-SWs 121. Similarly, the CM-SWs 111 of the disk array control units 1-1-1 and 1-1-2 are interconnected by inter-unit CM paths 142 via inter-unit CM-SWs 122. The SWs 121 and 122 are mounted as switch boxes.

In case, as in this embodiment, the disk array controller is made up of two disk array control units 1-1, these units can be connected directly through the inter-unit paths instead of using the inter-unit SWs 121 and 122 without imposing any problem on this invention, while eliminating the overhead process of data transfer in the inter-unit SWs 121 and 122.

The disk array controller 1 shown in FIG. 8 will be able to include three or more disk array control units 1-1 by designing the inter-unit SWs 121 and 122 to have an increased number of path connection. The number of the path, which can be mounted to the inter-unit SWs 121 and 122, is physically limited. For connecting disk array control units 1-1 in excess of the limit in the number of path connection of the inter-unit SWs 121 and 122, they cannot be connected by one inter-unit SW. In the case, the inter-units SWs are used in multiple stages to increase the number of the disk array controller connected.

Figure 19:
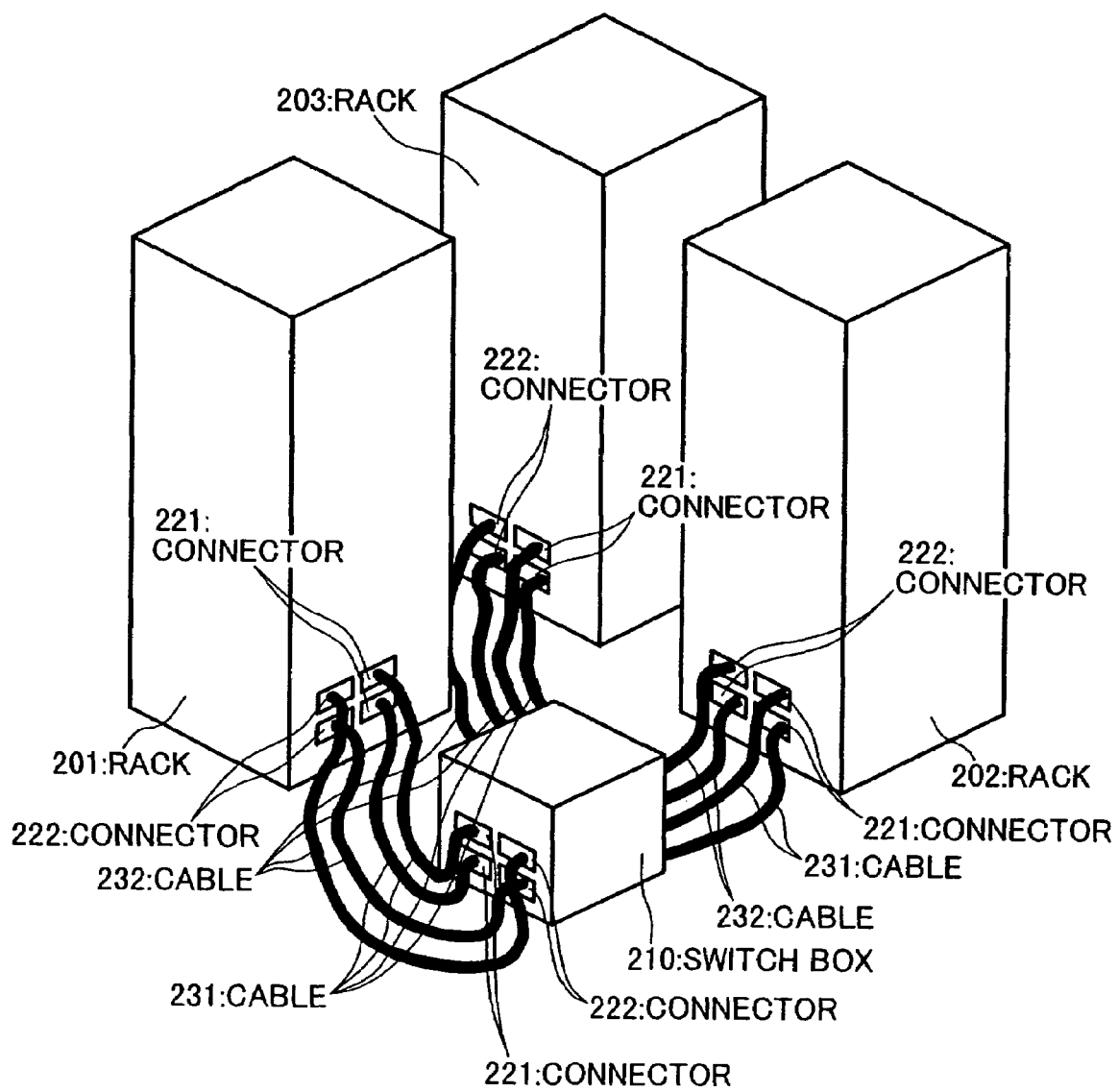
FIG. 19 is a perspective view of the structure of the wiring shown in FIG. 18 based on this invention.

FIG. 19 shows an example of a disk array controller which is made up of three disk array control units built on individual racks and interconnected through a switch box, as will be explained in detail later.

Figure 13:
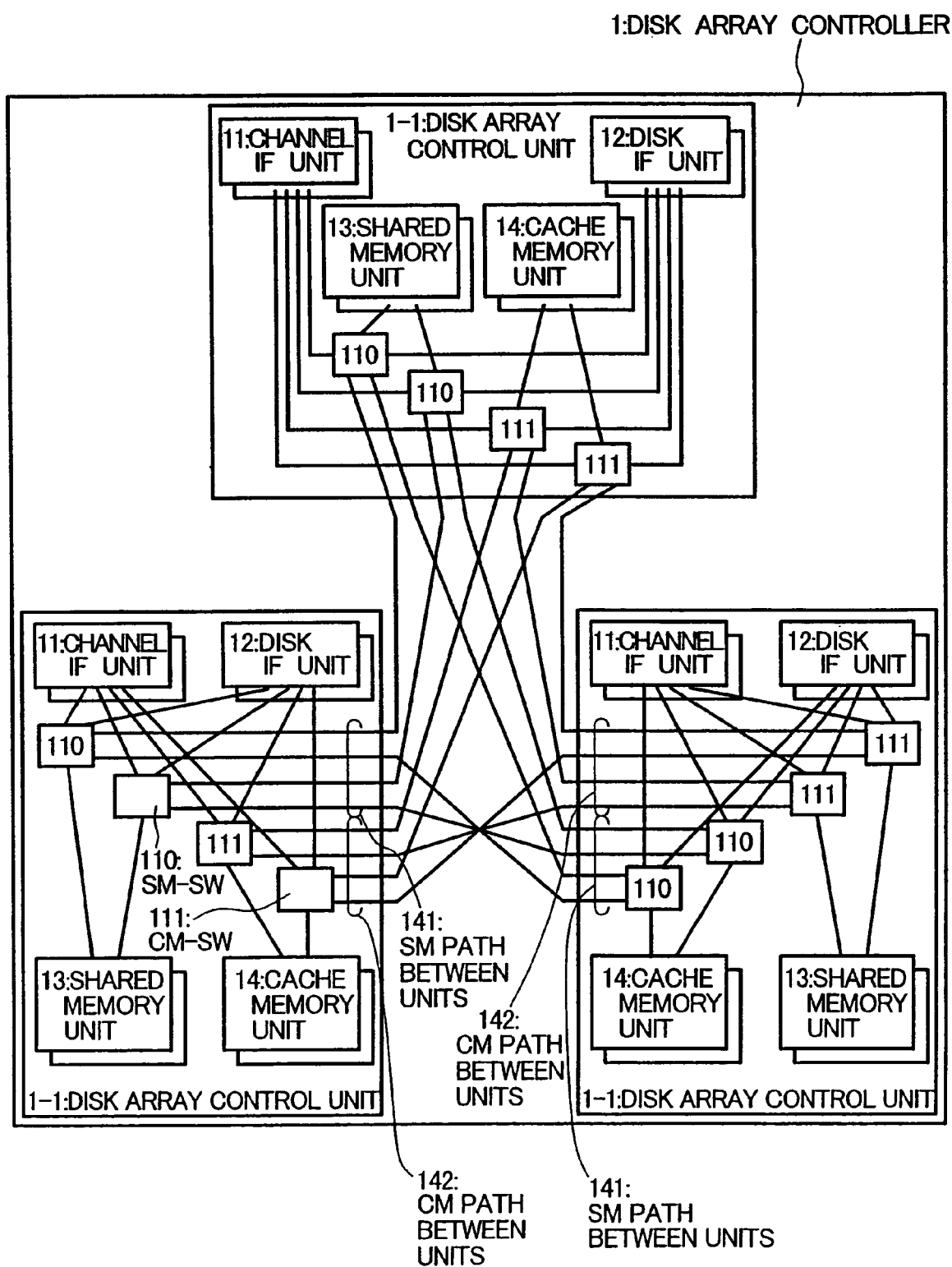
FIG. 13 is a block diagram showing the arrangement of a disk array controller made up of three disk array control units shown in FIG. 7 connected together.

For connecting three or more disk array control units 1-1, the SM-SWs 110 and CM-SWs 111 in all units 1-1 are each connected in a loop fashion as shown in FIG. 13. This interconnecting scheme enables the loop connection of multiple disk array control units 1-1 without using the inter-unit SWs 121 and 122. Specifically, the inter-unit SM paths of adjacent units 1-1 and the inter-unit CM paths of adjacent units 1-1 are each connected by connectors. Preferably, these connectors of the inter-unit SM paths 141 and inter-unit CM paths are fixed on the exterior wall of the disk array control units 1-1 for the convenience of the additional installation of units 1-1, although it is not shown in the figure.

In the arrangement of FIG. 8, the SM-SWs 110, inter-unit SM paths 141 and inter-unit SM-SWs 121 in unison constitute the interconnection 210 shown in FIG. 1, and the CM-SWs 111, inter-unit CM paths 142 and inter-unit CM-SWs 122 in unison constitute the interconnection 220.

An example of the operation of the arrangement shown in FIG. 8 for reading out data from a host computer 50 which is connected to the disk array control unit 1-1-1 will be explained.

Initially, the host computer 50 issues a data read-out request to the channel IF unit 11 in the disk array control unit 1-1-1 to which it is connected. The microprocessors 101 in the channel IF unit 11 which has received the request makes access to both shared memory units 13 in both disk array control units 1-1-1 and 1-1-2 thereby to find as to which hard disk drive 5 stores the requested data. The search is executed based on the conversion table stored in the shared memory units 13 indicative of the correspondence of the address of the requested data and hard disk drives which stores the data.

Subsequently, the microprocessors 101 in the channel IF unit 11 which has received the request makes access to both shared memory units 13 in both disk array control units 1-1-1 and 1-1-2 thereby to find as to whether or not the requested data is present in the cache memory units 14 in the disk array control units 1-1-1 and 1-1-2. The search is based on information stored in the shared memory units 13 indicative of the directory of data of the cache memory units 14.

In one case of finding the requested data in the cache memory unit 14 of the disk array control unit 1-1-1, the data is transferred to the channel IF unit 11 via the CM-SW 111 within the unit 1-1-1, and then it is sent to the host computer 50. In other case of finding the data in the cache memory unit 14 of the disk array control unit 1-1-2, the data is transferred to the channel IF unit 11 by way of the CM-SW 111 within the unit 1-1-2, the inter-unit CM-SW 122 and the self CM-SW 111, and then it is sent to the host computer 50.

In case the request data does not exist in any cache memory unit 14, the microprocessor 101 issues a command to another microprocessor 101 in the disk IF units 12 which is connected with the hard disk drive 5 where the requested data is stored, thereby operating it to read out and store the data from the hard disk drive 5 into one cache memory unit 14. On receiving the command, the microprocessor 101 in the disk IF unit 12 reads the requested data out of the hard disk drive 5 and stores the data in the cache memory unit 14 of the disk array control unit 1-1-1 or 1-1-2.

In one case of storing the data in the cache memory unit 14 in the disk array control unit 1-1-2 which is connected to the hard disk drive 5 where the requested data is stored, the data is transferred to the cache memory unit 14 via the CM-SW 111 in the disk array control unit 1-1-2. In another case of storing the requested data in the cache memory unit 14 in another disk array control unit 1-1-1 which is different from the disk array control unit 1-1-2 connected with the hard disk drives 5 in which the requested data is stored, the data is transferred by way of the CM-SWs 111 of both units 1-1-2 and 1-1-1 and the inter-unit CM-SW 122.

After the requested data has been stored in the cache memory unit 14, the microprocessor 101 in the disk IF unit 12 indicates the cache memory unit 14 where the data has been stored to the command-issuing microprocessor 101 in the channel IF unit 11. In response to this indication, the microprocessor 101 in the channel IF unit 11 read the data out of the cache memory unit 14 where the data has been stored and sends it to the host computer 50.

According to this embodiment, a host computer 50 can transact data with a hard disk drive 5 by simply issuing an access request to the disk array control unit 1-1 to which it is connected without being concerned with as to which hard disk drive 5 of which disk array control unit 1-1 is stored the data in need. Namely, the host computer 50 can deal with the multiple disk array control units 1-1 virtually as a single disk array controller 1.

Furthermore, in the case of reading out data from a hard disk drive 5 connected to a disk array control unit 1-1 which is different from the unit 1-1 that has received the request, the data can be read out by way of the internal interconnection and cache memory unit 14, instead of moving the data through the channel IF units 11 of both disk array control units 1-1, whereby the deterioration of data read/write performance can be alleviated.

[Embodiment 2]

Figure 5:
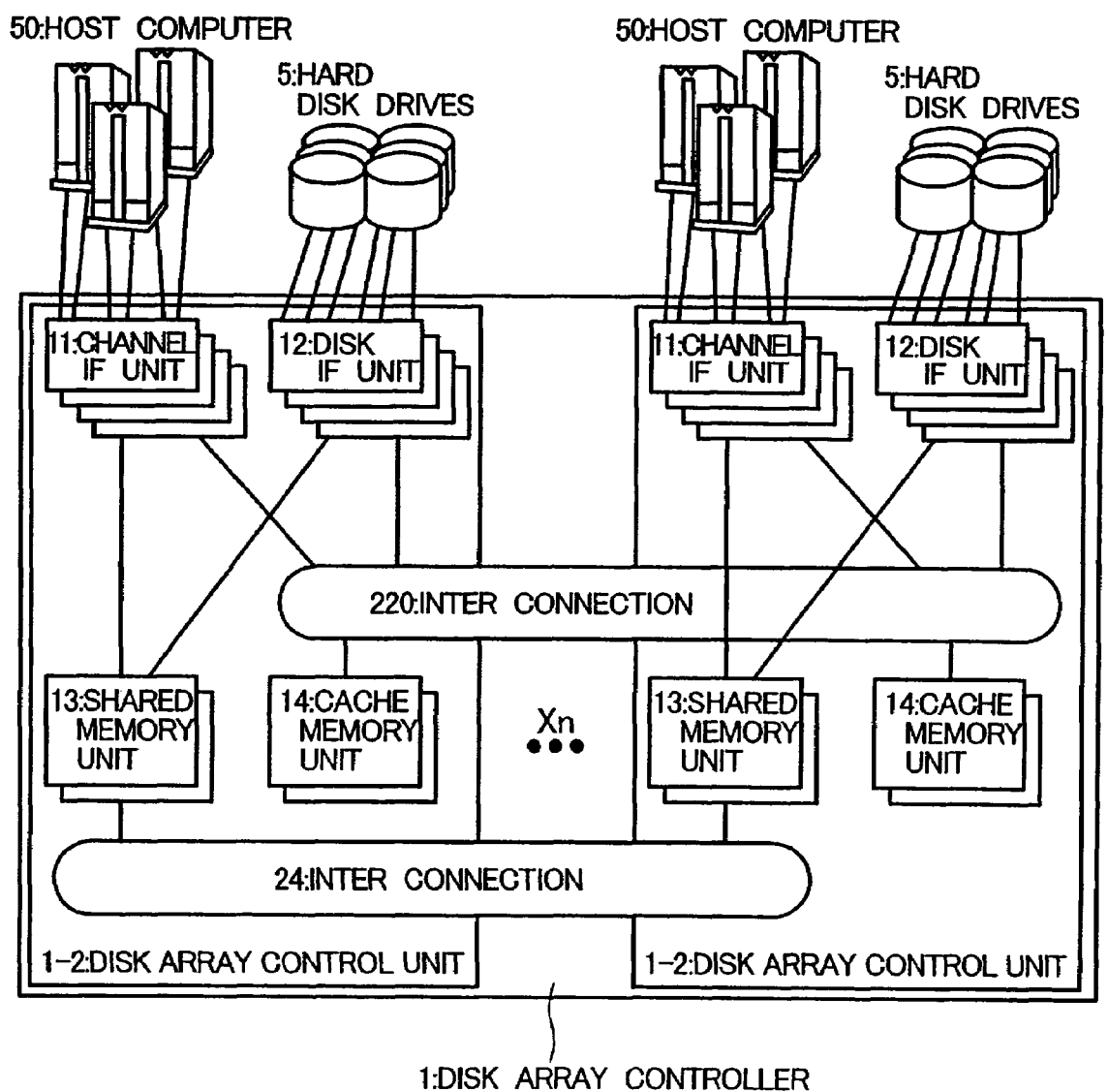
FIG. 5 is a block diagram showing the arrangement of another disk array controller based on this invention.
Figure 9:
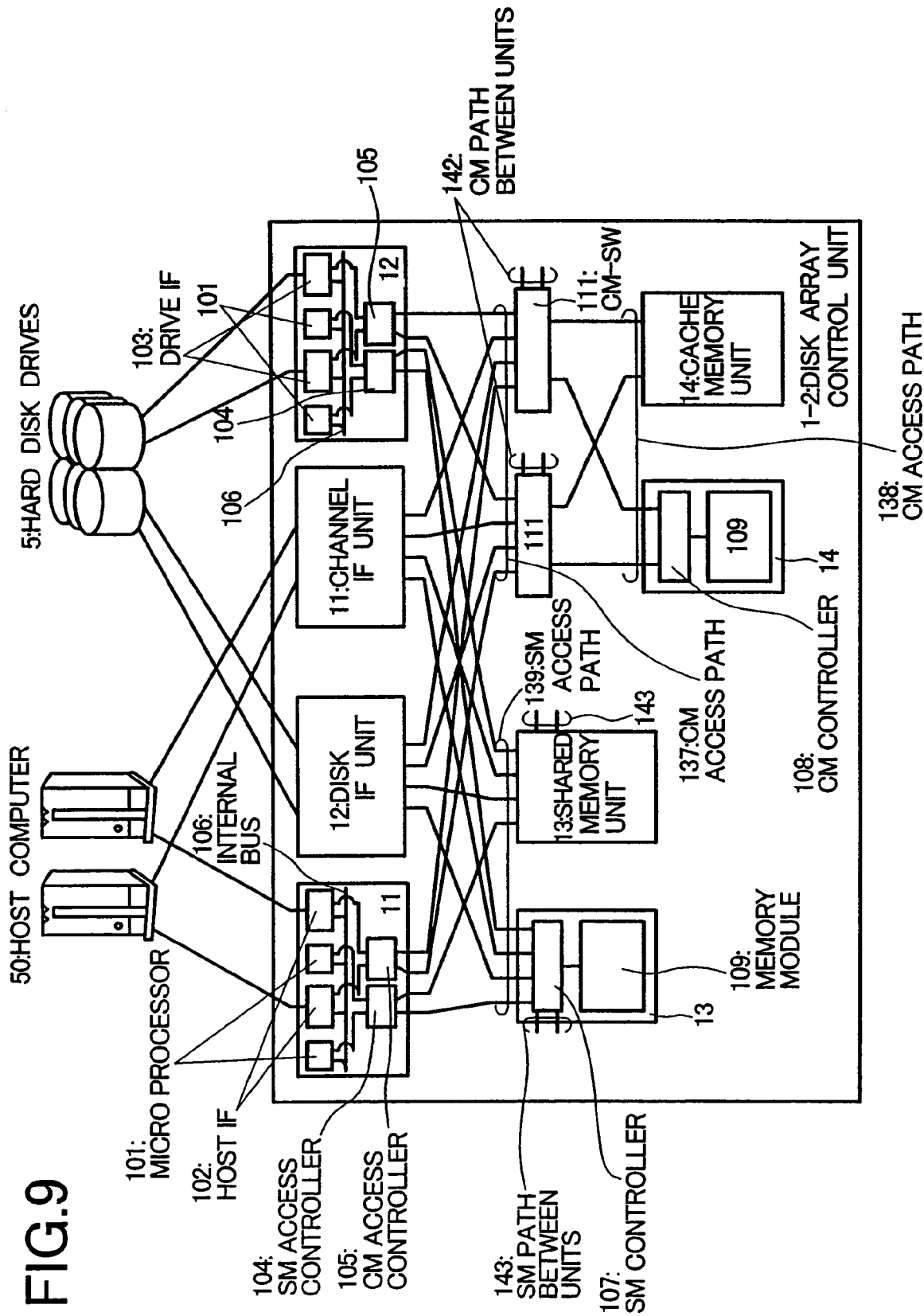
FIG. 9 is a block diagram showing the detailed arrangement of the disk array control unit shown in FIG. 5.
Figure 10:
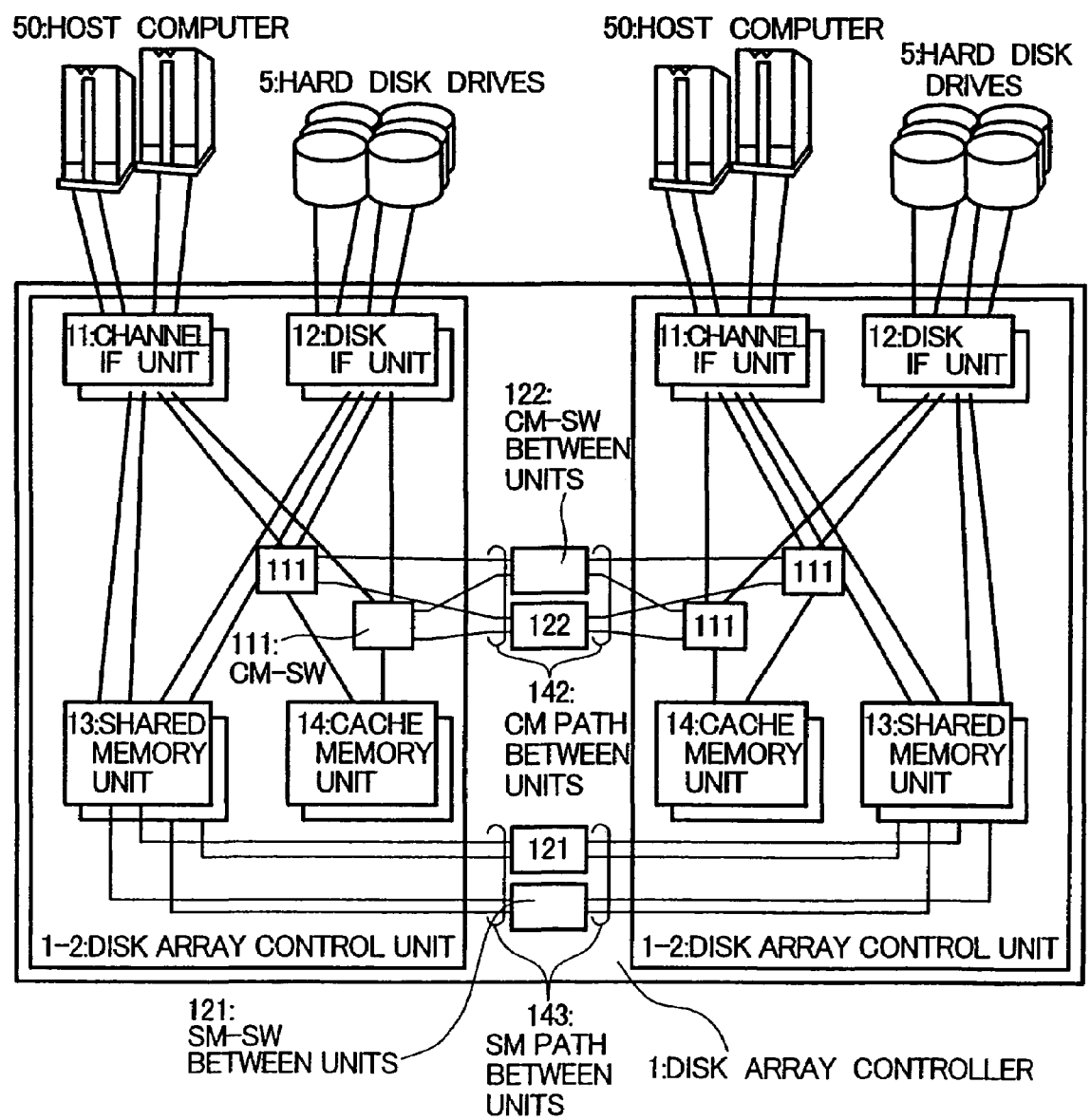
FIG. 10 is a block diagram showing the arrangement of a disk array controller made up of two disk array control units shown in FIG. 9 connected together.

FIG. 5, FIG. 9 and FIG. 10 show another embodiment of this invention.

In FIG. 5, a disk array controller 1 which is made up of multiple disk array control units 1-2 is arranged identically to the preceding Embodiment 1 shown in FIG. 1 except for the connection between the channel IF units 11 and disk IF units 12 and the shared memory units 13. In each disk array control unit 1-2, the channel IF units 11 and disk IF units 12 and the shared memory units 13 are connected directly. The shared memory units 13 are interconnected via an interconnection 24 between the disk array control units 1-2. Connecting the channel IF units 11 and disk IF units 12 and the shared memory units 13 directly in each disk array control unit 1-2 reduces the access time to the shared memory units 13 as compared with the connection via the interconnection 210 which is the case of Embodiment 1.

FIG. 9 shows a specific internal arrangement of the disk array control unit 1-2. The internal arrangement of the disk array control unit 1-2 is identical to the preceding Embodiment 1 shown in FIG. 7 except for the connection between the channel IF units 11 and disk IF units 12 and the shared memory units 13.

The disk array control unit 1-2 includes two channel IF units 11 for interfacing with computers 50, two disk IF units 12 for interfacing with hard disk drives 5, two cache memory path switches (CM-SWs) 111, two shared memory units 13, two cache memory units 14, shared memory (SM) access paths 139, a cache memory (CM) access paths 137 and 138, inter-unit SM paths 143, and inter-unit CM paths 142.

The SM access controller 104 is connected to two SM controllers 107 which is different from each other by two SM access paths 139. Accordingly, the SM controller 107 has the connection of four SM access paths 139 coming from the two channel IF units 11 and two disk IF units 12. The SM controller 107 also has the connection of two inter-unit SM paths 143 for the connection with SM controllers 107 of other disk array control unit 1-2.

Based on the above-mentioned access path connection of the SM controller 107, it has a function of directing access requests from the channel IF units 11 and disk IF units 12 over the four access paths to the access paths of the memory modules 109 and the two inter-unit access paths 143 of the shared memory units 13 in other disk array control unit 1-2.

FIG. 10 shows an example of the disk array controller 1 which is configured by connecting two disk array control units 1-2 shown in FIG. 9. The two disk array control units 1-2 have their shared memory units 13 interconnected by inter-unit SM paths 143 via inter-unit SM-SWs 121. The SM controllers 107 work for the connection nodes of the channel IF units and disk IF units and the shared memory units. The remaining portion is identical to the arrangement of Embodiment 1 shown in FIG. 8.

In case the disk array controller is made up of two disk array control units 1-2, these units can be connected directly through the inter-unit paths instead of using the inter-unit SWs 121 and 122 without imposing any problem on this invention, while eliminating the overhead process of data transfer in the inter-unit SWs 121 and 122 to improve the performance, as in the case of Embodiment 1.

The disk array controller 1 shown in FIG. 10 will be able to include three or more disk array control units 1-2 by designing the inter-unit SWs 121 and 122 to have an increased number of path connection, as in the preceding Embodiment 1.

The number of the path, which can be mounted to the inter-unit SWs 121 and 122, is physically limited. For connecting disk array control units 1-2 in excess of the limit in the number of path connection of the inter-unit SWs 121 and 122, they cannot be connected by one inter-unit SW. In the case, the inter-units SWs are used in multiple stages. These inter-unit SWs are built in a switch box, as in the preceding Embodiment 1.

Three or more disk array control units 1-2 can be chained in a loop fashion similar to the preceding Embodiment 1 shown in FIG. 13. The plural disk array control units 1-2 can be connected without using the inter-unit SWs 121 and 122.

The operation of the functional units in the disk array control unit 1-2 for writing or reading out data to/from the hard disk drives 5 by the host computers 50 is identical to the preceding Embodiment 1 except that the access to the shared memory unit 13 in other disk array control unit 1-2 takes place via the shared memory unit 13 in the self unit 1-2 and the interconnection 24.

The inter-unit SM paths 143, inter-unit SM-SWs 121, and SM controller 107 in unison constitute the interconnection 24.

According to this embodiment, a host computer 50 can transact data with a hard disk drive 5 by simply issuing an access request to the disk array control unit 1-2 to which it is connected without being concerned with as to which hard disk drive 5 of which disk array control unit 1-2 is stored the data in need. Namely, the host computer 50 can deal with the multiple disk array control units 1-2 virtually as a single disk array controller 1.

Furthermore, in the case of reading out data from a hard disk drive 5 connected to a disk array control unit 1-2 which is different from the unit 1-2 that has received the request, the data can be read out by way of the internal interconnection and cache memory unit 14, instead of moving the data through the channel IF units 11 of both disk array control units 1-2, whereby the deterioration of data read/write performance can be alleviated.

[Embodiment 3]

Figure 6:
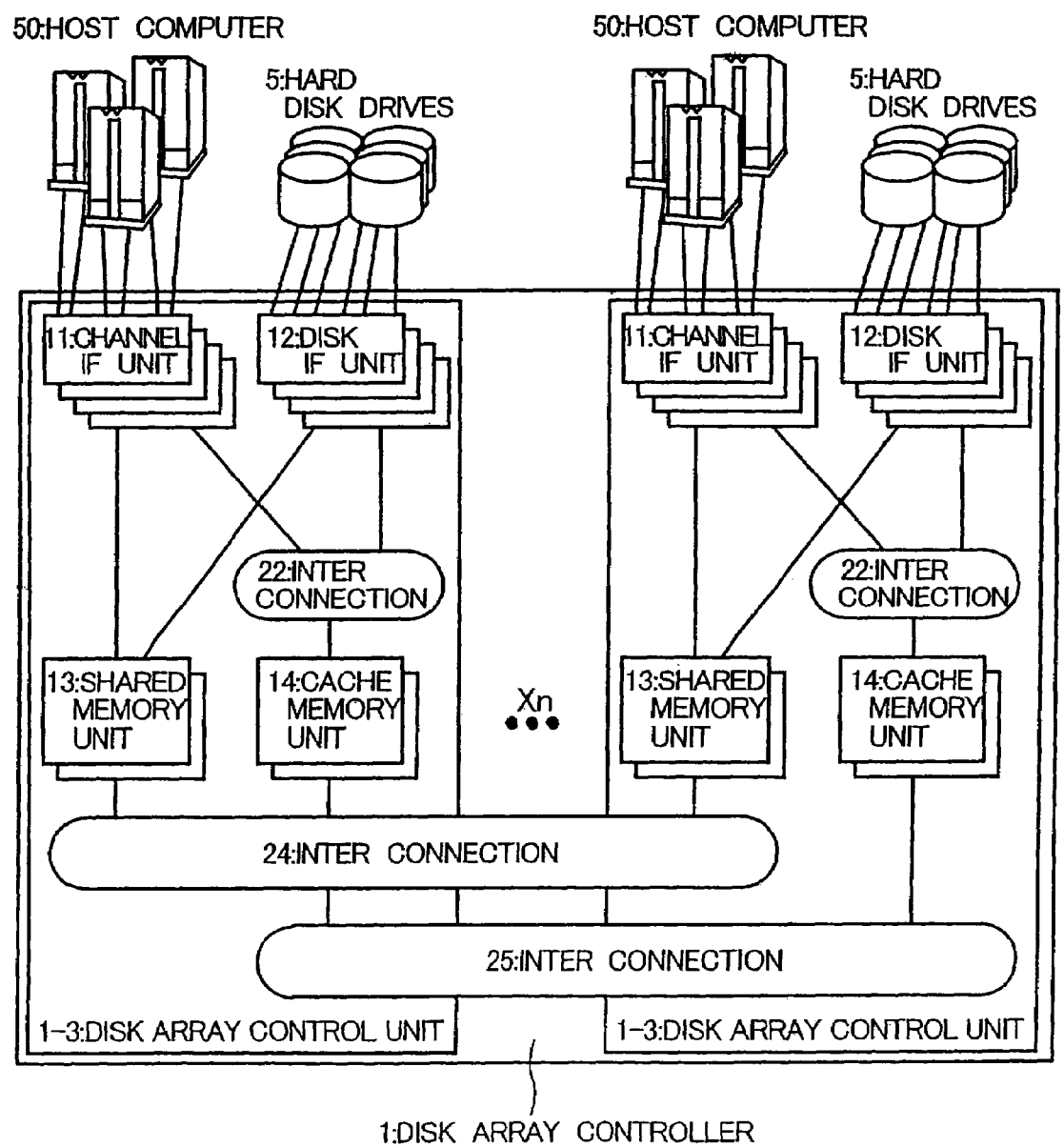
FIG. 6 is a block diagram showing the arrangement of still another disk array controller based on this invention.
Figure 11:
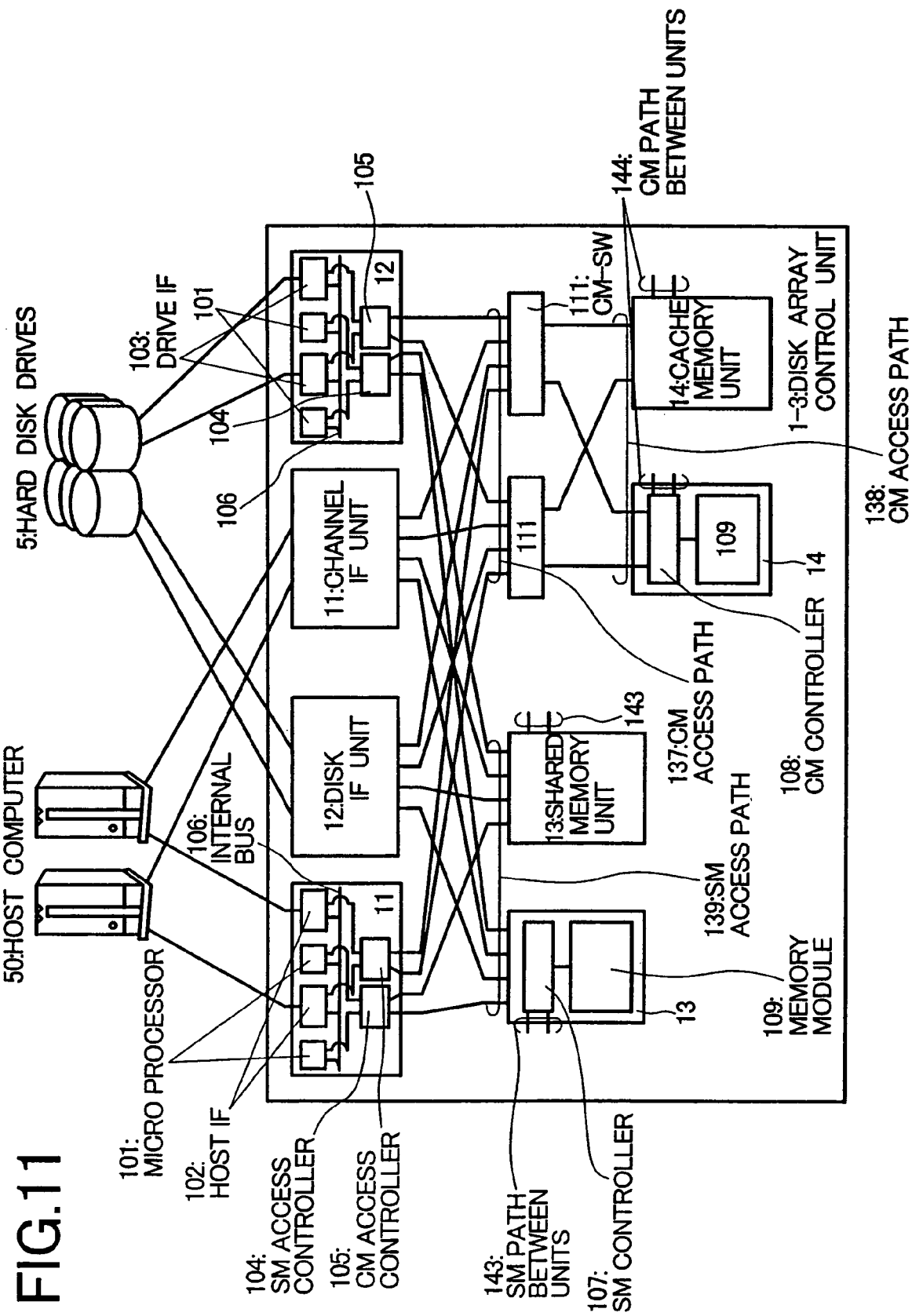
FIG. 11 is a block diagram showing the detailed arrangement of the disk array control unit shown in FIG. 6.
Figure 12:
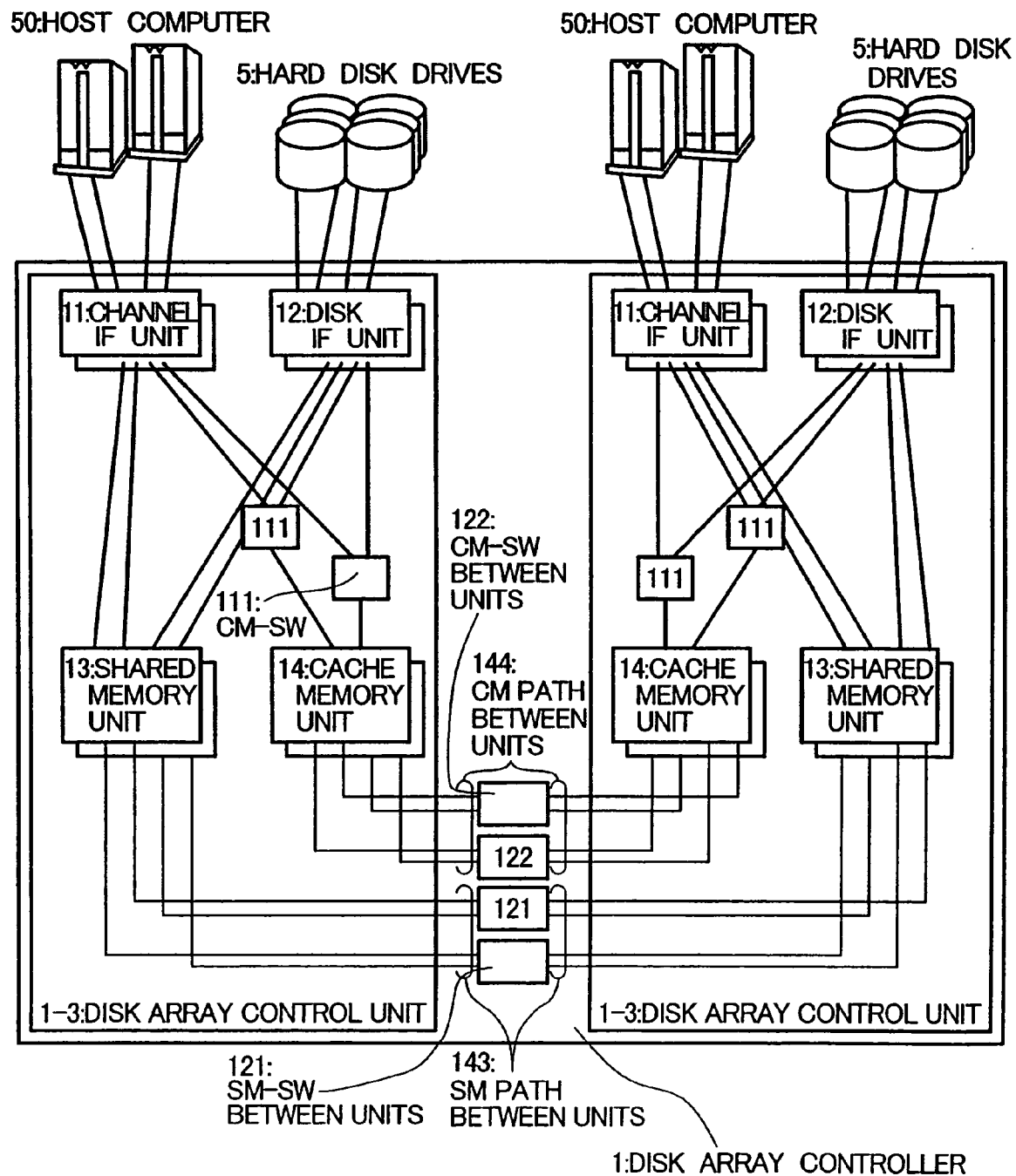
FIG. 12 is a block diagram showing the arrangement a disk array controller made up of two disk array control units shown in FIG. 11 connected together.

FIG. 6, FIG. 11 and FIG. 12 show another embodiment of this invention.

In FIG. 6, a disk array controller 1 which is made up of multiple disk array control units 1-3 is arranged identically to the preceding Embodiment 2 shown in FIG. 5 except for the connection between the channel IF units 11 and disk IF units 12 and the cache memory units 14. In each disk array control unit 1-3, the channel IF units 11 and disk IF units 12 and the cache memory units 14 are connected by an interconnection 22. The cache memory units 14 are interconnected between disk array control units 1-3 by an interconnection 25. The channel IF units 11 and disk IF units 12 and the shared memory units 13 are connected directly, whereas the channel IF units 11 and disk IF units 12 and the cache memory units 14 are connected by the interconnection 22, as in the case of the preceding Embodiment 2, by the following reason. The shared memory unit 13 deals with control data having a size of several bytes for example, whereas the cache memory unit 14 deals with data having a size of several kilobytes for example. Therefore, it is intended to raise the throughput based on the connection through the interconnection 22 with a limited number of pins.

By the separate provision of the interconnection 22 which connects the channel IF units 11 and disk IF units 12 and the cache memory units 14 and the interconnection 25 which connects the cache memory units 14 between the disk array control units 1-3, data transfer between cache memory units 14 of different disk array control units 1-3 does not preclude the host computers 50 from making access to the cache memory units 14.

The disk IF unit implements the data transfer between cache memories. The function of data transfer between cache memory units 14 of different disk array control units 1-3 is necessary for moving data to a disk array control unit of less-frequent access in dealing with concentrated accesses from host computers 50 to one disk array control unit 1-3.

FIG. 11 shows a specific internal arrangement of the disk array control unit 1-3. The internal arrangement of the disk array control unit 1-3 is identical to the preceding Embodiment 2 shown in FIG. 9 except for the connection between the channel IF units 11 and disk IF units 12 and the cache memory units 14. The CM controllers 108 work for the connection nodes of the channel IF units, disk IF units and cache memory units.

The disk array control unit 1-3 includes two channel IF units 11 for interfacing with host computers 50, two disk IF units 12 for interfacing with hard disk drives 5, two cache memory path switches (CM-SWs) 111, two shared memory units 13, two cache memory units 14, shared memory (SM) access paths 139, cache memory (CM) access paths 137 and 138, inter-unit SM paths 143, and inter-unit CM paths 144.

The CM access controller 105 is connected to two CM-SWs 111 by two CM access paths 137, and the CM-SW 111 is connected to two CM controllers 108 by two access paths 138. Accordingly, the CM controller 108 has the connection of two access paths 138 coming from the two CM-SWs 111, and it also has the connection of two inter-unit CM paths 144 for the connection with CM controllers 108 of other disk array control unit 1-3.

Based on the above-mentioned access path connection of the CM controller 108, it has a function of directing access requests from the CM-SWs 111 over the two CM access paths 138 to the access paths of the memory modules 109 and the two inter-unit CM access paths 144 of the cache memory units 14 in other disk array control unit 1-3.

The CM-SW 111 has the connection of four CM access paths 137 coming from the two channel IF units 11 and two disk IF units 12, and also has the connection of two access paths 138 going to the two cache memory units 14.

Based on this access path connection of the CM-SW 111, it has a function of directing access requests from the channel IF units 11 and disk IF units 12 over the four CM access paths 137 to the two CM access paths 138 of the cache memory units 14.

FIG. 12 shows an example of the disk array controller 1 which is configured by connecting two disk array control units 1-3 shown in FIG. 11. The two disk array control units 1-3 have their cache memory units 14 interconnected by inter-unit CM paths 144 via inter-unit CM-SWs 122. The remaining portion is identical to the arrangement of Embodiment 2 shown in FIG. 10.

In case the disk array controller is made up of two disk array control units 1-3, these units can be connected directly through the inter-unit paths instead of using the inter-unit SWs 121 and 122 without imposing any problem on this invention, while eliminating the overhead process of data transfer in the inter-unit SWs 121 and 122 to improve the performance, as in the case of Embodiment 2.

The disk array controller 1 shown in FIG. 12 will be able to include three or more disk array control units 1-3 by designing the inter-unit SWs to have an increased number of path connection, as in the preceding Embodiment 2. The number of the path, which can be mounted to the inter-unit SWs 121 and 122, is physically limited. For connecting disk array control units 1-3 in excess of the limit in the number of path connection of the inter-unit SWs 121 and 122, they cannot be connected by one inter-unit SW. In the case, the inter-units SWs are used in multiple stages.

Three or more disk array control units 1-3 can be chained in a loop fashion similar to the preceding Embodiment 1 shown in FIG. 13. The plural disk array control units 1-3 can be connected without using the inter-unit SWs 121 and 122.

The operation of the functional units in the disk array control unit 1-3 for transacting data with the hard disk drives 5 by the host computers 50 is identical to the preceding Embodiment 2 except that the access to the cache memory unit 14 in other disk array control unit 1-3 takes place via the cache memory unit 14 in the self unit 1-3 and the interconnection 25.

According to this embodiment, a host computer 50 can transact data with a hard disk drive 5 by simply issuing an access request to the disk array control unit 1-3 to which it is connected without being concerned with as to which hard disk drive 5 of which disk array control unit 1-3 is stored the data in need. Namely, the host computer 50 can deal with the multiple disk array control units 1-3 virtually as a single disk array controller 1.

Furthermore, in the case of reading out data from a hard disk drive 5 connected to a disk array control unit 1-3 which is different from the unit 1-3 that has received the request, the data can be read out by way of the internal interconnection and cache memory unit 14, instead of moving the data through the channel IF units 11 of both disk array control units 1-3, whereby the deterioration of data read/write performance can be alleviated.

Next, examples of the usage of the embodiments of this invention will be explained.

High-end disk array controllers have the following function. In the function, a data set (corresponding to a logical volume) for one work is duplicated and stored, and both the original and duplicate data sets are updated simultaneously in the ordinary work. At the emergence of the need of backup for the data set for example, updating of the duplicate data set is suspended and it is used for the backup, while the original data set is used continuously for the work, and the original and duplicate data sets are rendered the matching process on completion of backup.

In a disk array controller 1, which have been explained as Embodiment 1, a method of accomplishing this function for storing a duplicate data set in the different disk array control units 1-1 will be explained with reference to FIG. 8. It is assumed that an original data set is stored on the hard disk drive 5 connected to the disk array control unit 1-1-1 and a duplicate data set is stored on the hard disk drive 5 connected to the disk array control unit 1-1-2 in FIG. 8. It is also assumed that the host computer 50 connected to the disk array control unit 1-1-1 works for the ordinary work and the host computer 50 connected to the disk array control unit 1-1-2 works to backup data on a tape storage unit (not shown) connected to it.

In the ordinary work, in the event of a request of the host computer 50, which is connected to the disk array control unit 1-1-1, to write data to an intended data set, the microprocessor 101 in the channel IF unit 11, which is connected to the host computer 50 connected to the disk array control unit 1-1-1, transfers and writes the data which is sent from the host computer 50 into the cache memory unit 14 of the disk array control unit 1-1-1. Subsequently, the microprocessor 101 issues a command by way of the shared memory unit 13 of the disk array control unit 1-1-1 to the microprocessor 101 in the disk IF unit 12 which is connected to the hard disk drive 5 where the original data set is stored, thereby operating on it to read out data from the cache memory unit 14 of the disk array control unit 1-1-1, transfers the data to the disk IF unit 12 which is connected to the hard disk drive 5 where the original data set is stored, and operates on the disk IF unit 12 to transfer and write the data onto the hard disk drive 5.

The microprocessor 101 in the channel IF unit 11 of the disk array control unit 1-1-1, which monitors the updating of data of the original data set, stores in the shared memory units 13 of the disk array control unit 1-1-1 the control information indicative of the quantity of updated data of the original data set. When the quantity of updated data exceeds a predetermined value, the microprocessor 101 issues a command to the microprocessor 101 in the disk IF unit 12 which is connected with the hard disk drive 5 where the original data set is stored, thereby operating on it to revise the duplicate data set to match with the updated content of the original data set.

The command receiving microprocessor 101 reads out the updated data from the hard disk drive 5 and converts the addresses of updated data into addresses of the duplicate data set. It transfers and writes the updated data via the CM-SW 111 of the disk array control unit 1-1-1, inter-unit CM-SW 122 and CM-SW 111 of the disk array control unit 1-1-2 into the cache memory unit 14 of the disk array control unit 1-1-2.

Subsequently, the microprocessor 101 reads out the updated data from the cache memory unit 14, transfers the data to the disk IF unit 12 which is connected to the hard disk drive 5 where the duplicate data set is stored, and the data is transferred and stored onto the hard disk drive 5.

Based on the foregoing operation, the disk array controller maintains the original data set and duplicate data set during the ordinary work.

In the event of a request of the host computer 50, which is connected to the disk array control unit 1-1-2, to backup data for an intended data set, the microprocessor 101 in the channel IF unit 11 connected to the host computer 50 issues a command by way of the shared memory unit 13 of the disk array control unit 1-1-1 to the microprocessor 101 in the channel IF unit 11 which is connected to the host computer 50 having the ordinary work, thereby operating on it to halt the updating of the duplicate data set. The command receiving microprocessor 101 halts the updating of duplicate data set. The microprocessor 101 in the channel IF unit 11, which is connected to the backup requesting host computer 50, issue a command by way of the shared memory unit 13 of the disk array control unit 1-1-2 to the microprocessor 101 in the disk IF unit 12 which is connected to the hard disk drive 5 where the duplicate data set is stored, thereby operating on it to read out and transfer the duplicate data set from the hard disk drive 5 to the disk IF unit 12, from which it is transferred and written into the cache memory unit 14 of the disk array control unit 1-1-2.

Subsequently, the microprocessor 101 in the channel IF unit 11 reads out the duplicate data set from the cache memory unit 14 of the disk array control unit 1-1-2 and transfers it to the channel IF unit 11, from which it is sent to the backup requesting host computer 50.

On completion of backup of data set, the microprocessor 101 in the channel IF unit 11, which is connected to the backup requesting host computer 50, issues a command to the microprocessor 101 in the channel IF unit 11 which is connected to the host computer 50 having the ordinary work through the shared memory units 13 of the disk array control unit 1-1-1, thereby operating on it to revise the duplicate data set to match with the content of the original data set which has been updated during the backup process. This operation is identical to the data updating in the ordinary work explained previously.

In accomplishing the above-mentioned function, this operational scheme enables the movement of data between the two disk array control units 1-1-1 and 1-1-2 via the internal interconnections and cache memory units 14, eliminating the need of data transfer via the channel IF units of both disk array control units 1-1-1 and 1-1-2, whereby the deterioration of system performance during the implementation of this function is alleviated and thus the deterioration of efficiency of the user's ordinary work is prevented.

This operational scheme can be carried out equally in the disk array controller 1 of Embodiment 2 and Embodiment 3 without problems, and the same effectiveness is attained.

Other usages include the following.

In the disk array controllers 1 of Embodiment 1, Embodiment 2 and Embodiment 3, when a host computer 50 sends a data read request, for example, to a disk array control unit and if the data is absent on the hard disk drive 5 connected to the unit, it is necessary to read out the data via an interconnection from another disk array control unit connected with a hard disk drive 5 where the data is stored and send the data to the requesting host computer 50. The data read/write operation across the border of disk array control units, as in this case, results in the deterioration of performance as compared with the operation within a unit.

For avoiding the data transfer between units, it is necessary for the system to have a function of moving data, which is accessed frequently by one host computer 50 and is stored on a hard disk drive connected to a disk array control unit other than the control unit connected to the one host computer 50, to the hard disk drive 5 of the control unit connected to the one host computer 50.

This data moving function implemented by the disk array controller 1 of Embodiment 1 will be explained with reference to FIG. 8.

The microprocessor 101 in the channel IF unit 11 monitors the frequency of access to data sets (corresponding to logical volumes) on all hard disk drives 5, and stores control information indicative of the access frequency of the data sets in the shared memory units 13 within the same disk array control unit 1-1-1.

If the host computer 50 connected to the disk array control unit 1-1-1 makes access to the data set on the hard disk drive 5 connected to another disk array control unit 1-1-2 to concentrate the access on the data set, the access frequency is exceed a predetermined rate, the microprocessor 101 in the channel IF unit 11 of the disk array control unit 1-1-1 issues a command through the shared memory unit 13 in the other disk array control unit 1-1-2 to the microprocessor 101 in the disk IF unit 12 which is connected with the hard disk drive 5 where the data set is stored, thereby operating on it to read out the data set and transfer and write the data set into the cache memory unit 14 of the disk array control unit 1-1-2.

Subsequently, the microprocessor 101 in the channel IF unit 11 of the disk array control unit 1-1-1 reads out and transfers the relevant data from the cache memory unit 14 of the disk array control unit 1-1-2 to the cache memory unit 14 of the disk array control unit 1-1-1. The microprocessor 101 subsequently issues a command by way of the shared memory unit 13 in the disk array control unit 1-1-1 to the microprocessor 101 in the disk IF unit 12 of the disk array control unit 1-1-1, thereby operating on it to read out, transfer and write the relevant data from the cache memory unit 14 of the disk array control unit 1-1-1 onto the hard disk drive 5.

This operational scheme enables the movement of data between two disk array control units 1-1 via the internal interconnections and cache memory units 14, eliminating the need of data transfer via the channel IF units of both disk array control units, whereby the deterioration of system performance during the data movement is alleviated and thus the deterioration of efficiency of the user's ordinary work is prevented.

This operational scheme can be carried out equally in the disk array controller 1 of Embodiment 2 and Embodiment 3 without problems, and the same effectiveness is attained.

Next, the structure of the disk array controllers of Embodiment 1, Embodiment 2 and Embodiment 3 will be explained.

Figure 14:
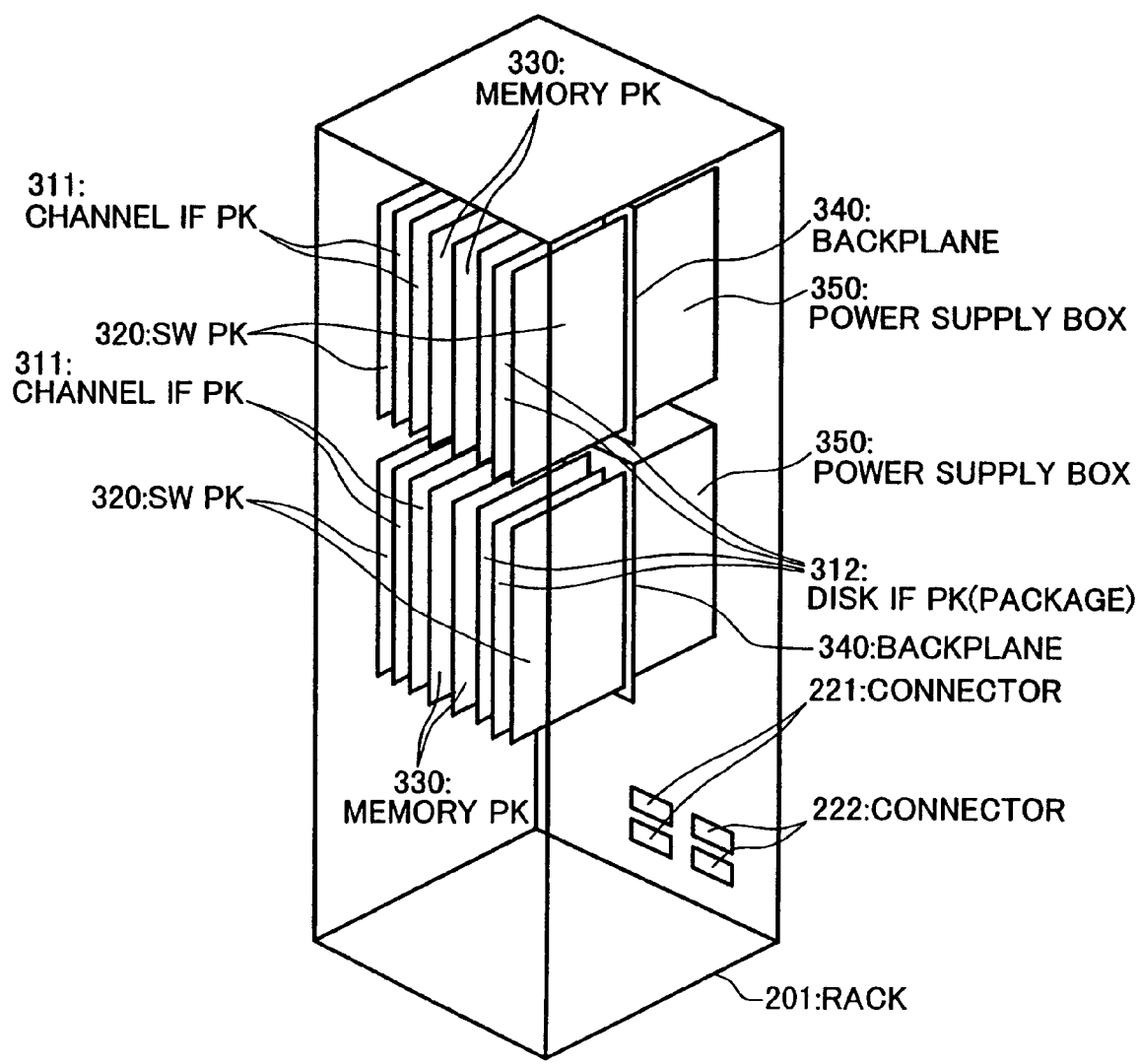
FIG. 14 is a perspective view showing the structure of a disk array control unit built on a rack based on this invention.

FIG. 14 shows an example of the structure of the disk array control unit 1-1 of Embodiment 1 shown in FIG. 7 built on a rack 201. The channel IF units 11 are arranged in channel IF packages (PKs) 311, the disk IF units 12 are arranged in disk IF packages 312, the SM-SWs 110 and CM-SWs 111 are arranged in switch packages 320, and the shared memory units 13 and cache memory units 14 are arranged in memory packages 330. These packages are plugged into the sockets on a back board 340, which has the wiring of the SM access paths 135 and 136 and the CM access paths 137 and 138.

The switch packages 320 has the connection of cables of the inter-unit SM paths 141 and cables of the inter-unit CM paths 142, and these cables have other ends connected to connectors 221 and 222, respectively, on the side wall of the rack 201. The cables are not shown. A power unit 350 supplies electric power to the packages. The disk array control unit built on a rack as shown operates as a stand-alone disk array controller.

Figure 15:
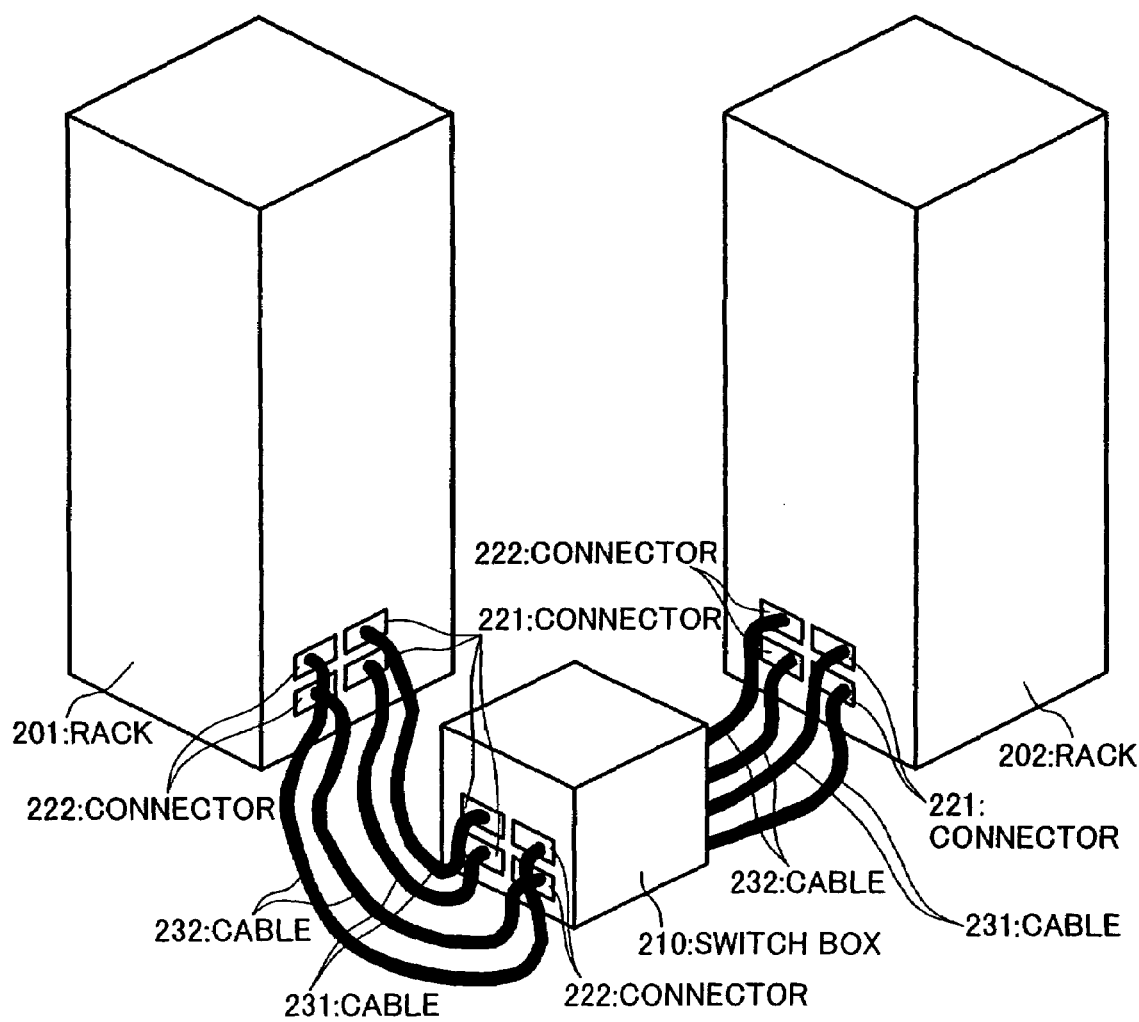
FIG. 15 is a perspective view showing the structure of a disk array controller made up of two disk array control units which are built on racks and interconnected.

FIG. 15 shows an example of the interconnection of two sets of the disk array control unit built on the rack 201 shown in FIG. 14.

A switch box 210 houses the inter-unit SM-SWs 121 and inter-unit CM-SWs 122 shown in FIG. 8. The inter-unit SM paths 141 coming from the inter-unit SM-SWs 121 are connected to connectors 221, and the inter-unit CM paths 142 coming from the inter-unit CM-SWs 122 are connected to connectors 222.

For interconnecting the two disk array control units on the racks 201 and 202, the inter-unit SM path connectors 221 on the rack 201 are connected to the connectors 221 on the switch box 210 with cables 231, and the inter-unit CM path connectors 222 on the rack 201 are connected to the connectors 222 on the switch box 210 with cables 232. Similarly, the connectors 221 on the rack 202 are connected to the connectors 221 on the switch box 210 with cables 231, and the inter-unit CM path connectors 222 on the rack 202 are connected to the connectors 222 on the switch box 210 with cables 232.

The disk array controller built on two racks in this manner can deal with an increased number of host computer channels and an increased storage capability.

By designating the racks 201 and 202 to be a basic and extension racks, respectively, and accommodating the switch box 210 inside the extension rack 202, it becomes possible to eliminate the floor space for the switch box 210 without increasing the manufacturing cost of the basic rack 201.

This structural scheme can also be applied to the disk array controllers of Embodiment 2 and Embodiment 3 without any problem.

Figure 18:
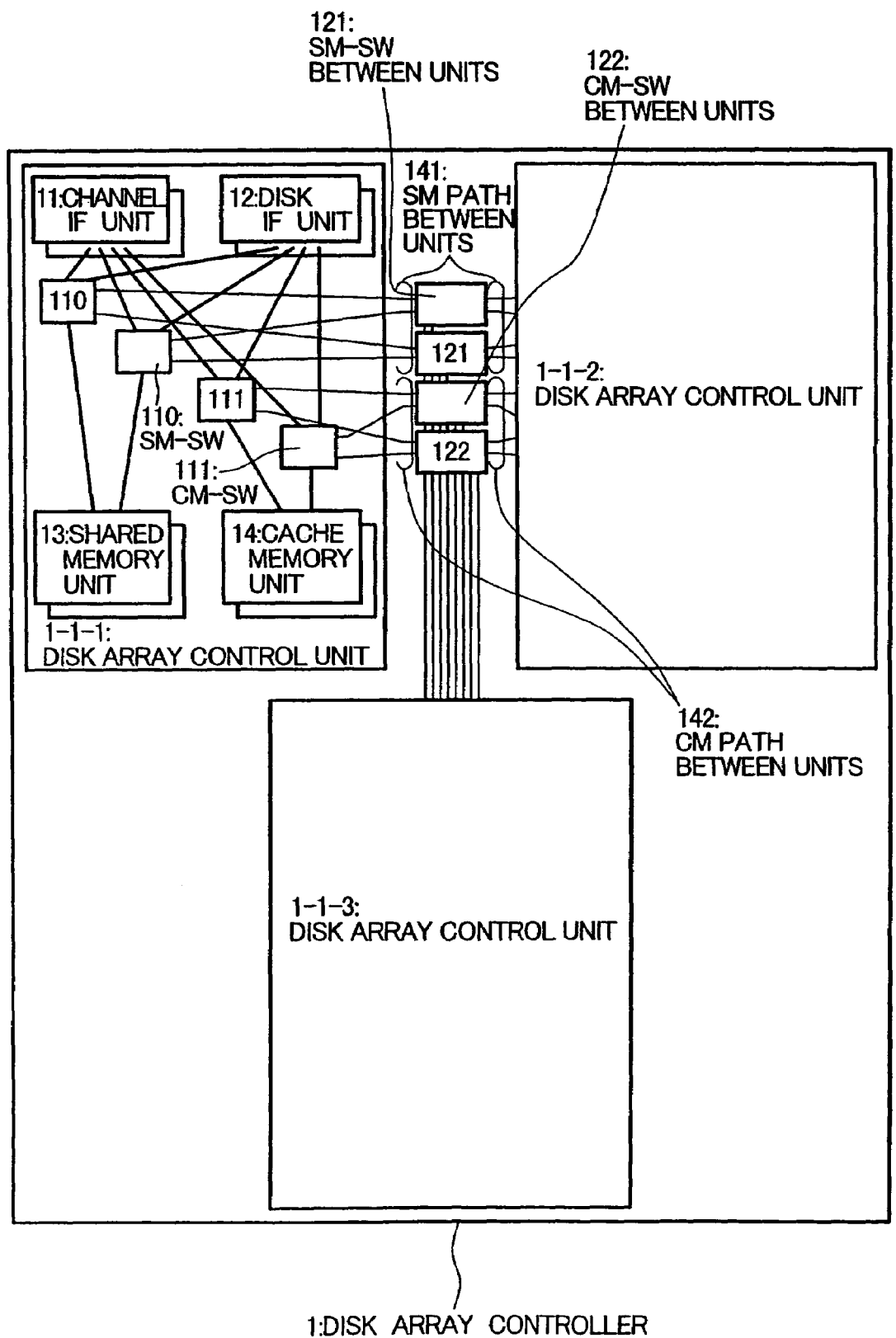
FIG. 18 is a block diagram showing the wiring scheme for three disk array control units based on inter-rack switches.

FIG. 18 shows the interconnection of three disk array control units by inter-unit SM-SWs 121 and CM-SWs 122. Each switch (SW) which connects three disk array control units must have a larger capability as compared with the case of connecting two units. Specifically, disk array control units 1-1-1, 1-1-2 and 1-1-3 are interconnected through inter-unit SM paths 141 and inter-unit CM paths 142 via the inter-unit SM-SWs 121 and CM-SWs 122, and function as a disk array controller.

FIG. 19 shows the structure of this disk array controller. The switch box 210 has a separate rack. The disk array control units built on individual racks 201,202 and 203 are interconnected by inter-unit SM path cables 231 and connectors 221 and inter-unit CM path cables 232 and connectors 222. Providing more capability and more connectors for the switch box 210 for connecting four or more disk array control units facilitates the additional installation in the future.

Figures 21, 22:
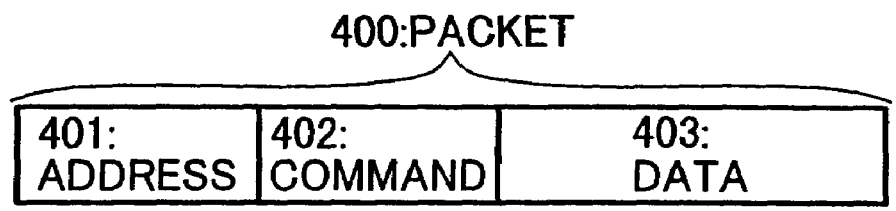
FIG. 21 is a diagram showing an example of the data format of information of path switching which is given to the switch box.
FIG. 22 is a table showing an example of the reference table of information of path switching provided in the switch box.

FIG. 21 shows the format of data which is transferred through the switch box 210. Data has a form of packet, and it consists of a destination address field 401, command field 402 and data field 403. The address is of the shared memory and cache memory.

FIG. 22 shows a reference table 410 for path switching provided in the switch box 210. This table contains the correspondence between the destination address and the port number of the disk array control unit. The switch box 210 makes reference to the path switching table to determine a destination unit based on the address 401 in the packet data 400 and implements the path switching.

Additional installation of disk array control units is carried out based on the following procedure. If the switch box 210 has spare connectors for additional disk array control units, cables 231 and 232 are connected to these connectors. If there are no spare connectors, another switch box is added in a multi-stage configuration and cables 231 and 232 are connected to it. The path switching table 410 in the switch box 210 is revised to include the addresses and port numbers for the additional disk array control units. An alternative design of the table is to preset additional addresses with flags so that address flags are turned on for the additional unit installation.

Figure 20:
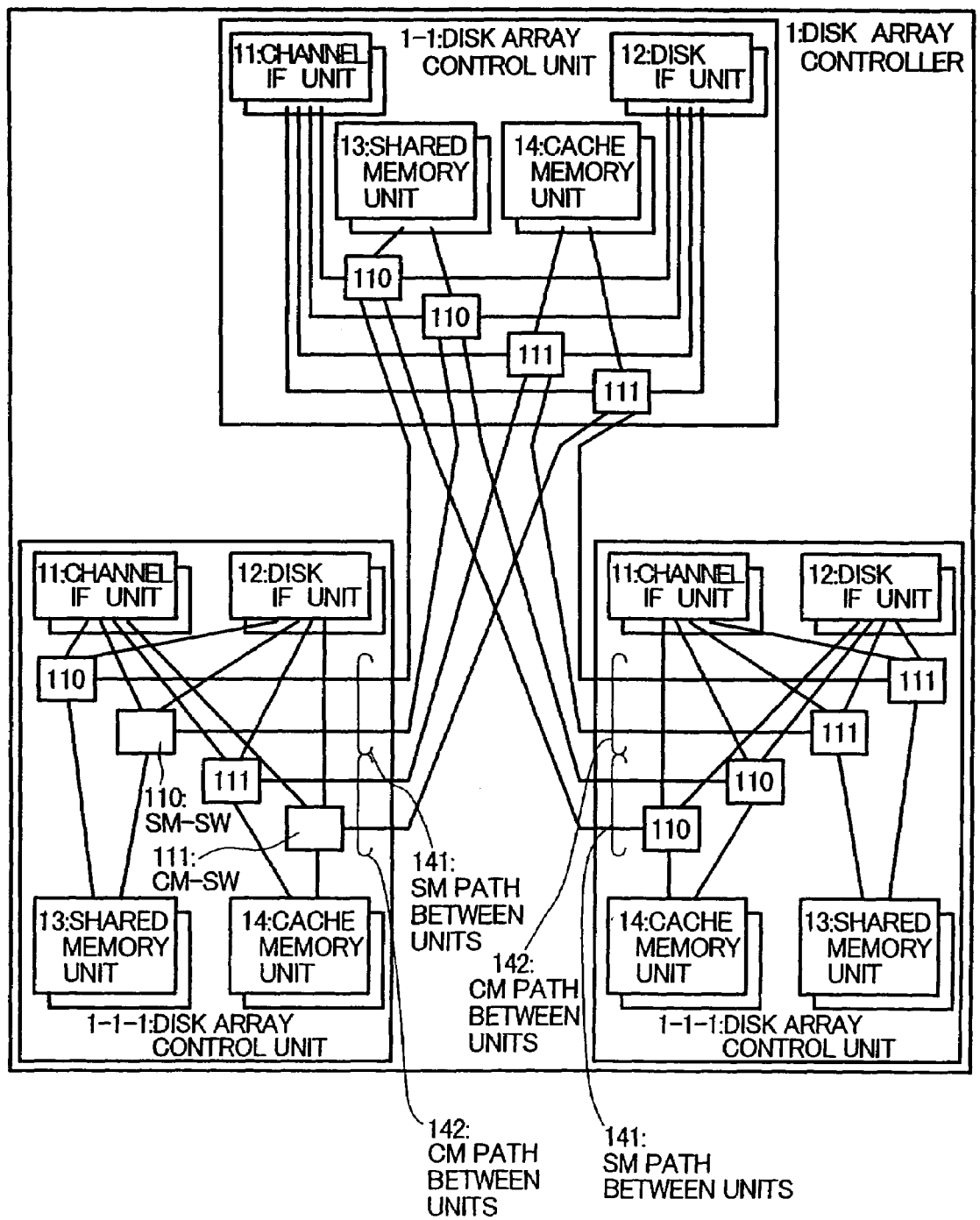
FIG. 20 is a block diagram showing the connection of three disk array control units based on this invention.

FIG. 20 shows another unit interconnection scheme. In a disk array controller, three disk array control units are interconnected in series. SM-SWs 110 and CM-SWs 111 have a bridge function of transferring incoming data intact to other disk array control unit. These SM-SWs 110 and CM-SWs 111 may be replaced with common buses, by which multiple disk array control units are interconnected.

Further the other embodiment will be shown as follows.

Figure 16:
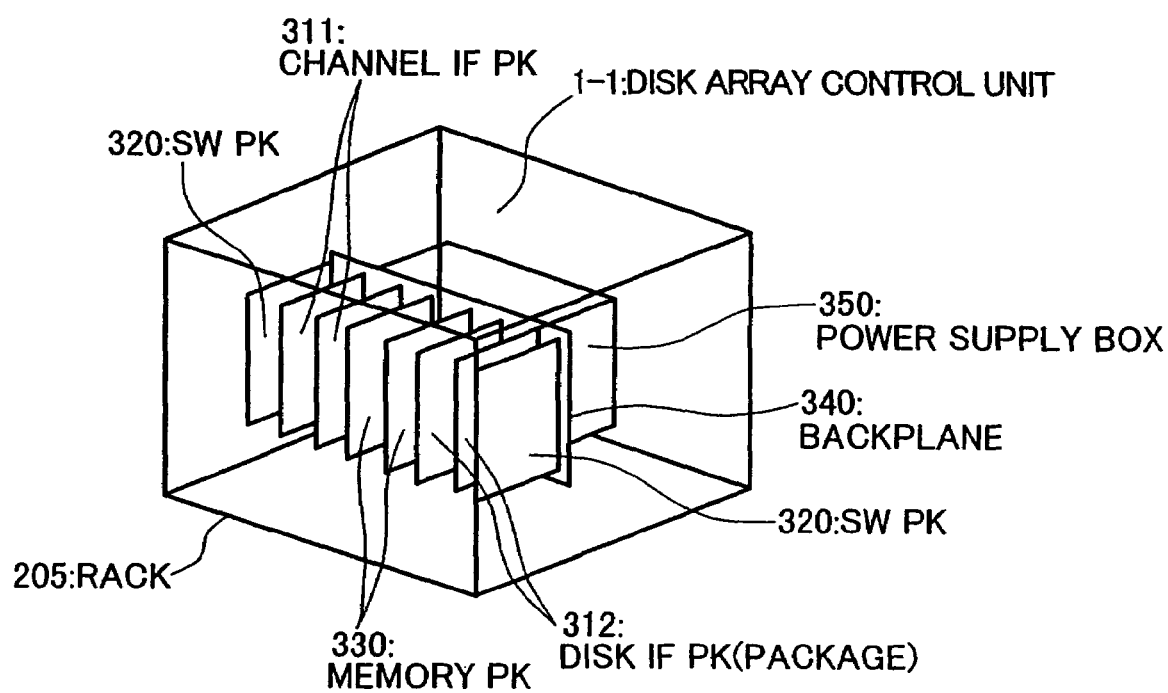
FIG. 16 is a perspective view showing the structure of a disk array control unit built on a different rack based on this invention.

As shown in FIG. 16, a disk array control unit made up of a minimal number of packages (PKs), which are used in the unit rack 201 shown in FIG. 14, is built on a rack 205.

Figure 17:
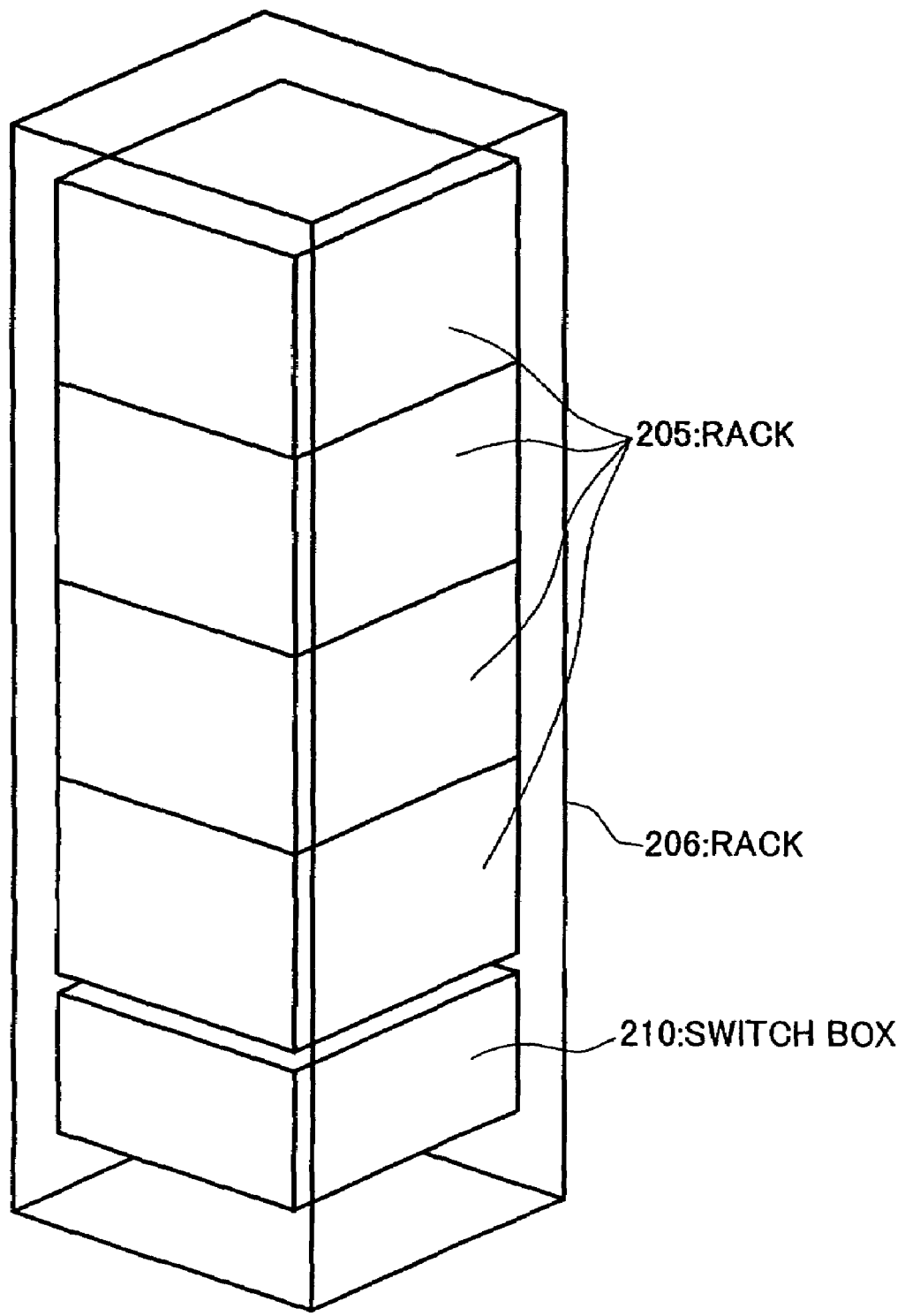
FIG. 17 is a perspective view showing the structure of a disk array controller made up of four disk array control units which are built on one rack based on this invention.

As shown in FIG. 17, two or more unit racks 205 and a switch box 210 are built on a large rack 206, and the units on the racks 205 are interconnected via the switch box 210 based on the interconnection scheme of the sixth embodiment. This structure is suitable for middle-scale to large-scale disk array controllers. The rack 205 has the same role for the disk array control unit as of the foregoing one, or alternatively the disk array control unit may have a module structure. Each disk array control unit on the rack 206 may include an individual power unit, or all units may be supplied with power from a single power unit.

According to the present invention, it becomes possible to construct a disk array system which is based on the operation of multiple disk array control units as a single disk array controller and is capable of alleviating the deterioration of performance caused by the movement of data between the disk array control units.

What is claimed is:

1. A storage apparatus system comprising:
   a plurality of controllers; and
   a plurality of disk drives connected to said controllers,
   wherein each of said controllers comprises:
   a first interface connected to a computer,
   a second interface connected to said disk drives, and
   a first memory connected to said first and second interfaces, and
   wherein said first memory of said controller is interconnected to other first memories of the other controllers by a first communication line, and
   wherein said first memory temporarily stores data which is written to or read from said disk drives via said first and second interfaces in response to an access request from said computer.

2. The storage apparatus system according to claim 1, wherein each of said controllers further comprises:
   a second memory connected to said first and second interfaces, and
   wherein said second memory of said controller is interconnected to other second memories of the other controllers by a second communication line.

3. The storage apparatus system according to claim 2, wherein each of said first memories is a cache memory, and each of said second memories is a shared memory for storing control information.

4. The storage apparatus system according to claim 3, wherein said second memories are connected through switches to said first and second interfaces.

5. The storage apparatus system according to claim 4, wherein each of said first and second communication lines is composed of switches.

6. The storage apparatus system according to claim 5, wherein said first communication line is the same as said second communication line.

* * * * *